United States Patent
Matsubara et al.

(10) Patent No.: US 9,824,140 B2
(45) Date of Patent: Nov. 21, 2017

(54) METHOD OF CREATING CLASSIFICATION PATTERN, APPARATUS, AND RECORDING MEDIUM

(71) Applicant: FUJITSU LIMITED, Kawasaki-shi, Kanagawa (JP)

(72) Inventors: Masazumi Matsubara, Yamato (JP); Yasuhiko Kanemasa, Kawasaki (JP); Hirokazu Iwakura, Adachi (JP); Atsushi Kubota, Yokohama (JP); Junichi Higuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 614 days.

(21) Appl. No.: 14/331,980

(22) Filed: Jul. 15, 2014

(65) Prior Publication Data
US 2015/0032749 A1    Jan. 29, 2015

(30) Foreign Application Priority Data
Jul. 23, 2013  (JP) ................................ 2013-153105

(51) Int. Cl.
*G06F 17/30*    (2006.01)

(52) U.S. Cl.
CPC .. *G06F 17/30705* (2013.01); *G06F 17/30286* (2013.01); *G06F 17/30684* (2013.01)

(58) Field of Classification Search
CPC .............................................. G06F 17/30705
USPC ........................................................ 707/741
See application file for complete search history.

(56) References Cited

U.S. PATENT DOCUMENTS

| | | | | |
|---|---|---|---|---|
| 6,353,821 | B1 * | 3/2002 | Gray ................ | G06F 17/30321 707/715 |
| 2011/0060733 | A1 * | 3/2011 | Peng ................ | G06F 17/30867 707/723 |
| 2012/0143893 | A1 * | 6/2012 | Abraham ............ | G06F 11/3476 707/769 |
| 2012/0215757 | A1 * | 8/2012 | Weisman .......... | G06F 17/30864 707/709 |
| 2012/0324582 | A1 | 12/2012 | Park | |

(Continued)

FOREIGN PATENT DOCUMENTS

| | | |
|---|---|---|
| JP | 2004-240517 | 8/2004 |
| JP | 2012-123539 | 6/2012 |

OTHER PUBLICATIONS

Extended European Search Report dated Dec. 11, 2014 in corresponding European Patent Application No. 14177039.6.

(Continued)

*Primary Examiner* — Mahesh Dwivedi
(74) *Attorney, Agent, or Firm* — Staas & Halsey LLP

(57) ABSTRACT

A method includes: extracting a partial character string including a reserved word and a character string immediately previous or subsequent to the reserved word from each of a plurality of pieces of target data, the plurality of pieces of target data conforming to a first pattern character string including the reserved word defined by a protocol; detecting target data including the partial character string among the plurality of pieces of target data; specifying a first partial character string from the extracted partial character string based on the detected target data; and creating, by a processor, a second pattern character string for classifying the plurality of pieces of target data based on the first pattern character string and the first partial character string.

14 Claims, 28 Drawing Sheets

(56) References Cited

U.S. PATENT DOCUMENTS

2013/0238611 A1* 9/2013 Chaturvedi ............ G06Q 10/06
  707/723
2013/0346447 A1* 12/2013 Wu ................... G06F 17/30876
  707/776
2014/0273908 A1* 9/2014 Englert .................. H04H 60/37
  455/345

OTHER PUBLICATIONS

Jerzy W. Grzymala-Busse et al., "A Comparison of Two Partial Matching Strategies for Classification of Unseen Cases", IEEE 2006, pp. 800-805.

Zhang Lili et al., "Study of Automobile Electric Controlled System Fault Diagnosis Based on Classification Pattern Recognition", Proceedings of the 2010 IEEE International Conference on Information and Automation, Jun. 20-23, Harbin, China, pp. 2076-2081.

* cited by examiner

SQL CLASSIFICATION PATTERN TABLE 414-ex1

| RANK | CLASSIFICATION PATTERN | FREQUENCY OF APPEARANCE | DECOMPOSABLE FLAG | |
|---|---|---|---|---|
| 1 | /^SELECT(.*)FROM TBL1 WHERE(.*)$/ | 3,658 | DECOMPOSABLE | ~801-1 |
| 2 | /^UPDATE TBL1 SET num='200' WHERE(.*)$/ | 2,105 | NOT DECOMPOSABLE | ~801-2 |
| 3 | /^INSERT(.*)INTO(.*)VALUES(.*)$/ | 783 | DECOMPOSABLE | ~801-3 |
| 4 | /^UPDATE TBL1 SET (?!num='200') WHERE(.*)$/ | 383 | DECOMPOSABLE | ~801-4 |
| 5 | /^UPDATE Stores SET(.*)WHERE(.*)$/ | 253 | NOT DECOMPOSABLE | ~801-5 |
| ... | ... | ... | ... | |

SQL CLASSIFICATION PATTERN TABLE 414-ex2

| RANK | CLASSIFICATION PATTERN | AVERAGE RESPONSE TIME [ms] | DECOMPOSABLE FLAG | |
|---|---|---|---|---|
| 1 | /^SELECT(.*)FROM(.*)WHERE(.*)$/ | 13.5 | DECOMPOSABLE | 1401-1 |
| 2 | /^UPDATE TBL1 SET (?!num='200') WHERE(.*)$/ | 10.5 | NOT DECOMPOSABLE | 1401-2 |
| 3 | /^INSERT(.*)INTO(.*)VALUES(.*)$/ | 9.4 | DECOMPOSABLE | 1401-3 |
| 4 | /^UPDATE TBL1 SET num='200' WHERE(.*)$/ | 8.8 | DECOMPOSABLE | 1401-4 |
| 5 | /^UPDATE Stores SET(.*)WHERE(.*)$/ | 8.5 | NOT DECOMPOSABLE | 1401-5 |
| ... | ... | ... | ... | |

| RANK | CLASSIFICATION PATTERN | FREQUENCY OF APPEARANCE | APPEARANCE RATIO [%] | DECOMPOSABLE FLAG | |
|---|---|---|---|---|---|
| 1 | /^SELECT(.*)FROM TBL1 WHERE(.*)$/ | 3,658 | 31.2 | DECOMPOSABLE | 2501-1 |
| 2 | /^UPDATE TBL1 SET num='200' WHERE(.*)$/ | 2,105 | 21.1 | NOT DECOMPOSABLE | 2501-2 |
| 3 | /^INSERT(.*)INTO(.*)VALUES(.*)$/ | 783 | 7.8 | DECOMPOSABLE | 2501-3 |
| 4 | /^SELECT(.*)FROM (?!TBL1) WHERE(.*)$/ | 535 | 5.3 | DECOMPOSABLE | 2501-4 |
| 5 | /^UPDATE TBL1 SET (?!num='200') WHERE(.*)$/ | 383 | 3.8 | NOT DECOMPOSABLE | 2501-5 |
| ... | ... | ... | ... | ... | |

METHOD OF CREATING CLASSIFICATION PATTERN, APPARATUS, AND RECORDING MEDIUM

CROSS-REFERENCE TO RELATED APPLICATION

This application is based upon and claims the benefit of priority of the prior Japanese Patent Application No. 2013-153105, filed on Jul. 23, 2013, the entire contents of which are incorporated herein by reference.

FIELD

The embodiments discussed herein are related to a method, and an apparatus, and a recording medium related to classification pattern creation.

BACKGROUND

In an example of related art of technology of classifying a message group and analyzing messages in accordance with the classification results, a classification rule is created based on a feature pattern of each piece of text data with a frequent pattern as an attribute, the frequent pattern detected from a combination of words repeatedly appearing in text data based on the morphological analysis results, and also based on class data specifying a class of text data. In another example of related art, metadata of messages with a frequency of appearance equal to or higher than a threshold is taken as a keyword, a first filter associated with the keyword and a second filter not associated with the keyword are separately provided, and a group of first filters for respective keywords and a group of second filters for respective keywords are created.

Japanese Laid-open Patent Publication No. 2004-240517 and Japanese Laid-open Patent Publication No. 2012-123539 are examples of related art.

SUMMARY

According to an aspect of the invention, a method includes: extracting a partial character string including a reserved word and a character string immediately previous or subsequent to the reserved word from each of a plurality of pieces of target data, the plurality of pieces of target data conforming to a first pattern character string including the reserved word defined by a protocol; detecting target data including the partial character string among the plurality of pieces of target data; specifying a first partial character string from the extracted partial character string based on the detected target data; and creating, by a processor, a second pattern character string for classifying the plurality of pieces of target data based on the first pattern character string and the first partial character string.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, according to related art, it is difficult to create a classification pattern for messages transmitted and received by a server. For example, if specifying the tendency of messages transmitted and received by the server is difficult, deciding classification pattern creation criteria is difficult.

In an embodiment, it is desirable to provide a classification pattern creating method, and an apparatus, and a recording medium related to classification pattern creation capable of efficiently creating a classification pattern for classifying messages.

Embodiments of the disclosed method, apparatus, and recording medium related to classification pattern creation are described in detail with reference to the drawings.

First Embodiment

Figure 1:
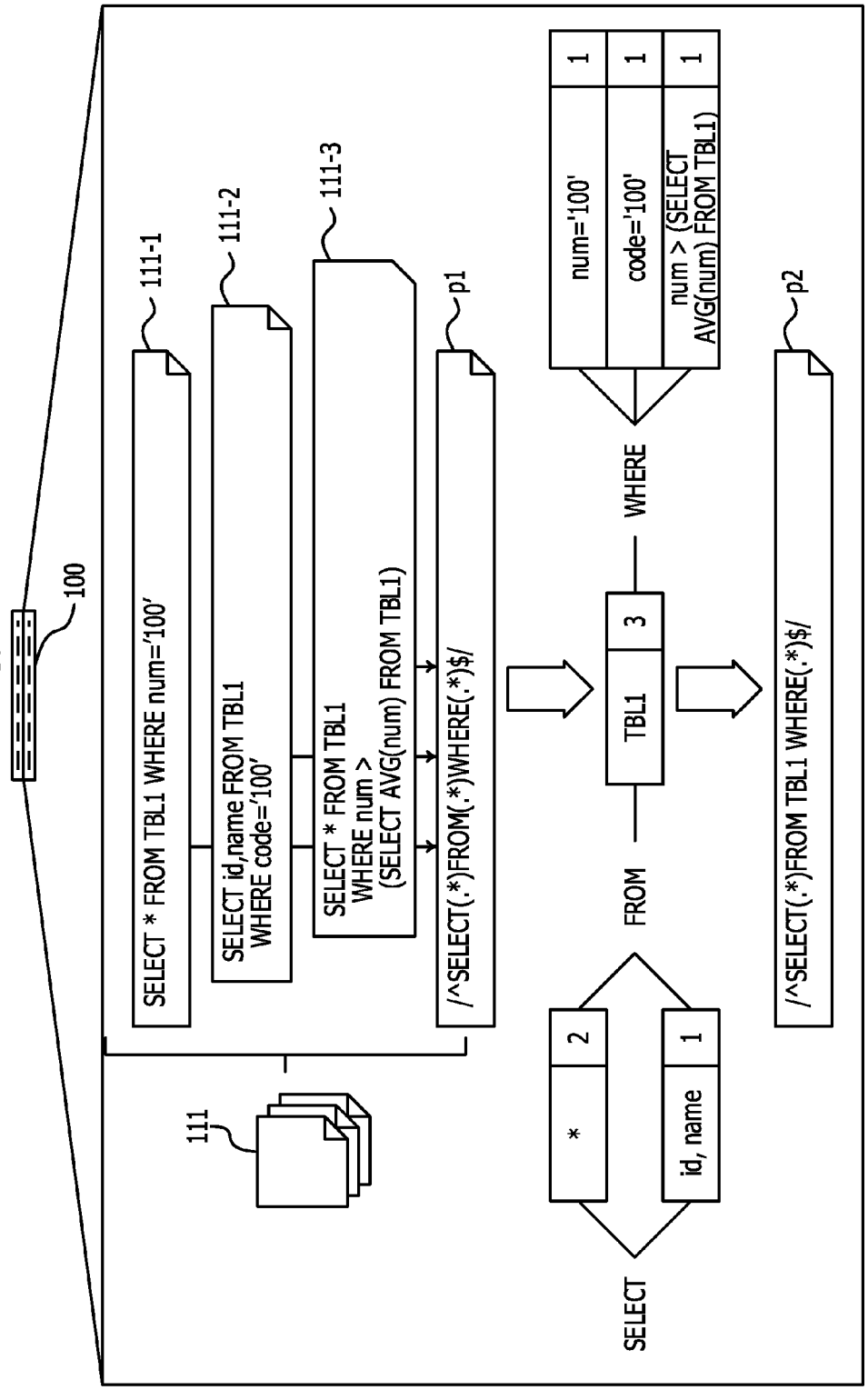
FIG. 1 depicts an example of operation of a classification pattern creating apparatus according to a first embodiment.

FIG. 1 depicts an example of operation of a classification pattern creating apparatus according to a first embodiment. A classification pattern creating apparatus 100 is a computer used to analyze messages (telegraphic messages) and create a classification pattern for classifying the messages. A message is a character string according to a protocol. Therefore, the classification pattern creating apparatus 100 creates a classification rule in association with the protocol. Examples of the protocol include protocols for application layers such as Hypertext Transfer Protocol (HTTP), Internet Inter-ORB Protocol (IIOP), and Simple Mail Transfer Protocol (SMTP), and protocols for session layers such as Structured Query Language (SQL). In the following example, description is made with SQL taken as an example. A message according to SQL is hereinafter referred to as "SQL data".

The classification pattern is represented by a pattern character string representing a character string sequence. The pattern character string is hereinafter simply referred to as a "classification pattern". The classification pattern allows an analyzer performing statistical analysis to view SQL data and assemble a regular expression for character string matching. In this case, when an addition or improvement is provided to the system to be analyzed, the system structure becomes complex and, as a result, it becomes difficult to specify what type of message will appear. If specifying what type of message will appear is difficult, deciding classification pattern creation criteria is also difficult. Also, SQL data may have a nested structure, and it is difficult to create a classification pattern. Moreover, if the statistical results from the classification results according to the classification rule are not desirable by the analyzer performing statistical analysis, a classification rule along with expectations may be created. This case also incurs costs of creating a classification pattern again by the analyzer.

To address the above, the classification pattern creating apparatus 100 creates a classification pattern where a character string with a high frequency of appearance paired with a reserved word in an SQL data group conforming to the classification pattern including the reserved word is taken as a character string following the reserved word. With this, the classification pattern creating apparatus 100 creates a pattern for classifying the SQL data group that influences system performance.

Figure 5:
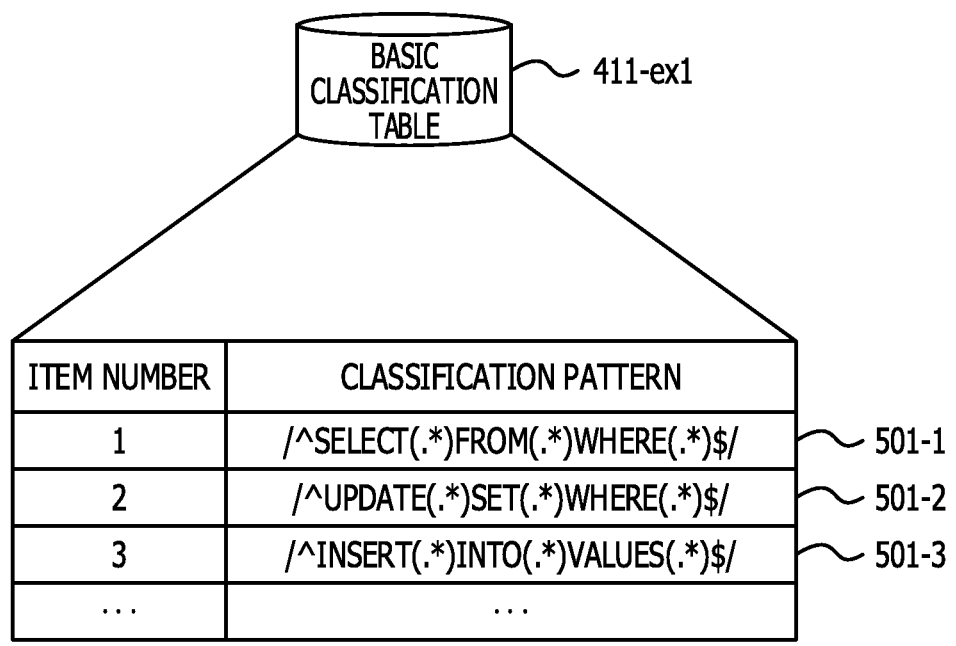
FIG. 5 depicts an example of details stored in a basic classification table in a first decomposition example.

After roughly classifying SQL data, the classification pattern creating apparatus 100 decomposes a classification pattern until reaching a predetermined threshold. The classification pattern creating apparatus 100 extracts a partial character string formed of a reserved word and a character string immediately previous or subsequent to the reserved word from each piece of SQL data included in the SQL data group 111 conforming to a first classification pattern p1. The first classification pattern p1 includes a reserved word defined by a protocol. Also, the first classification pattern p1 does not include a character string depending on the system to be analyzed, and is represented by a regular expression as matching any SQL basic syntax. An example of the first classification patter p1 is depicted in FIG. 5. The partial character string is extracted so that redundancy of either one of the character string immediately previous to the reserved word and the character string immediately subsequent to the reserved word is avoided.

In the example of FIG. 1, messages 111-1, 111-2, and 111-3 are depicted as messages included in an SQL data group 111. Then, reserved words included in the SQL data group 111 conforming to the first classification pattern p1 are "SELECT", "FROM", and "WHERE". Character strings immediately subsequent to "SELECT" in the SQL data of the SQL data group 111 are "*" and "id, name", respectively. Also, a character string immediately subsequent to "FROM" in the SQL data of the SQL data group 111 is "TBL1". Furthermore, character strings immediately subsequent to "WHERE" in the SQL data of the SQL data group 111 are "num='100'", "code='100'", and "num>(SELECT AVG (num) FROM TBL1)", respectively.

Therefore, as a partial character string formed of the reserved word "SELECT" and a character string immediately subsequent thereto, the classification pattern creating apparatus 100 extracts "SELECT *" and "SELECT id, name" from the SQL data group 111. Also, as a partial character string formed of the reserved word "FROM" and a character string immediately subsequent thereto, the classification pattern creating apparatus 100 extracts "FROM TBL1" from the SQL data group 111. Furthermore, as a partial character string formed of the reserved word "WHERE" and a character string immediately subsequent thereto, the classification pattern creating apparatus 100 extracts "WHERE num='100'" and "WHERE code='100'" from the SQL data group 111. Still further, as a partial character string formed of the reserved word "WHERE" and a character string immediately subsequent thereto, the classification pattern creating apparatus 100 extracts "WHERE num>(SELECT AVG(num) FROM TBL1)" from the SQL data group 111.

Subsequently, the classification pattern creating apparatus 100 detects SQL data including a partial character string. The classification pattern creating apparatus 100 then specifies a partial character string from the extracted character string based on the detected SQL data. The classification pattern creating apparatus 100 may specify a partial character string with the maximum number of pieces of SQL data including the partial character string, or may specify a partial character string with the maximum response time of SQL data including the partial character string or a partial character string with the maximum total of the response times. FIG. 1 depicts an example of specifying a partial character string with the maximum number of pieces of SQL data.

In the example of FIG. 1, the numbers of pieces of detected SQL data including "SELECT *" and "SELECT id, name" are 2 and 1, respectively. Also, the number of pieces of SQL data including "FROM TBL1" is 3. Furthermore, the numbers of pieces of SQL data including "WHERE num='100'", "WHERE code='100'", and "WHERE num> (SELECT AVG(num) FROM TBL1)" are 1, 1, and 1, respectively.

Therefore, as a partial character string with the maximum number of pieces of SQL data including the partial character string, the classification pattern creating apparatus 100 specifies "FROM TBL1" with three pieces of data. Then, by using the specified partial character string, the classification pattern creating apparatus 100 creates a new classification pattern p2. In the example of FIG. 1, as the classification pattern p2, the classification pattern creating apparatus 100 creates "/^SELECT(.*)FROM TBL1 WHERE(.*)$/" by replacing the second (.*) in the classification pattern p1 by "TBL1".

Figure 2:
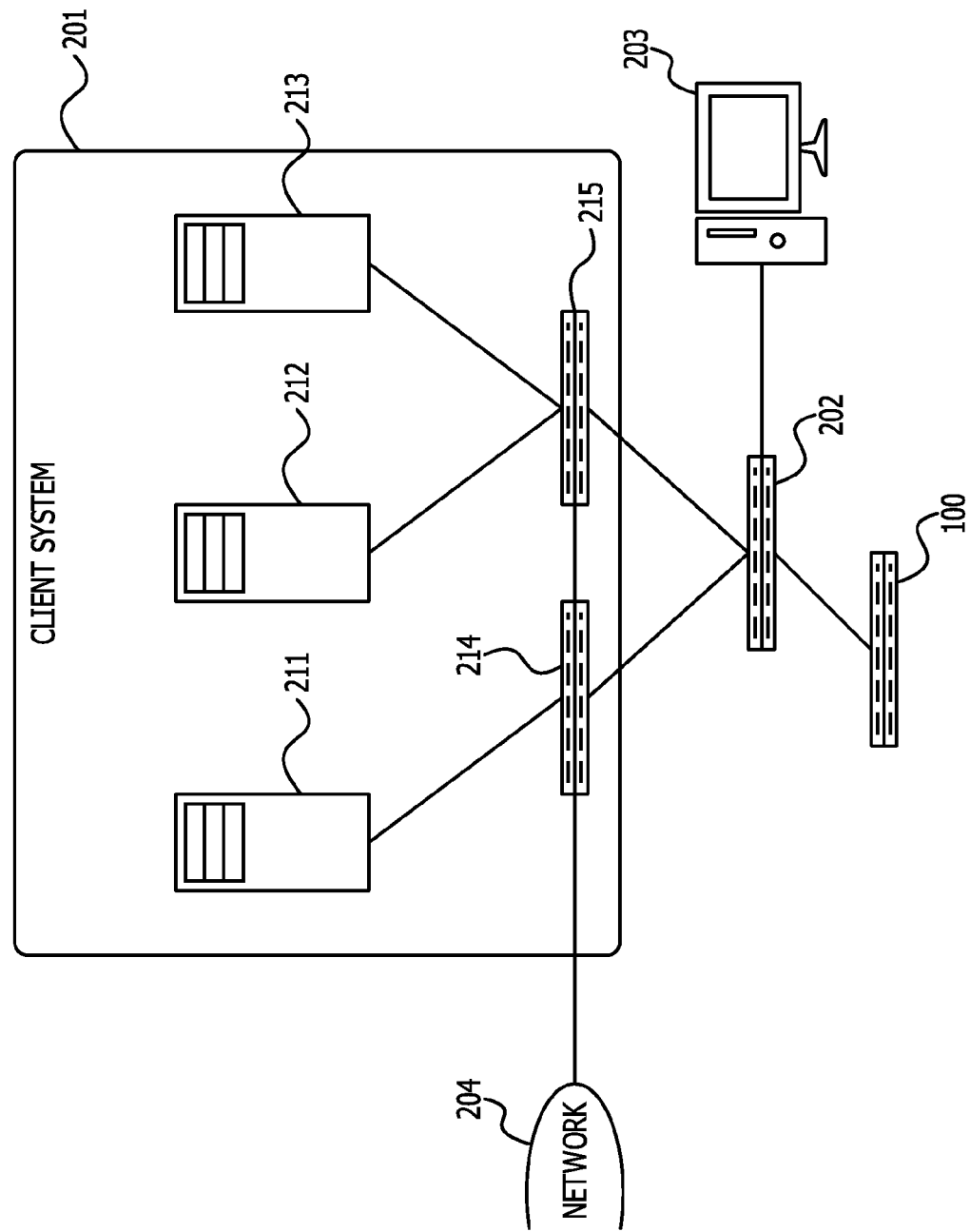
FIG. 2 depicts an example of connection among the classification pattern creating apparatus, a system visualizing apparatus, and a client system according to the first embodiment.

Now, a relation among the classification pattern creating apparatus 100, a system visualizing apparatus using the classification pattern created by the classification pattern creating apparatus 100, and a system to be visualized by the system visualizing apparatus is described by using FIG. 2.

FIG. 2 depicts an example of connection among the classification pattern creating apparatus, the system visualizing apparatus, and a client system according to the first embodiment. A client system 201 is connected to a system visualizing apparatus 202. The system visualizing apparatus 202 is connected to the classification pattern creating apparatus 100 and an administrator terminal 203. The client system 201 has a web server 211, an application server 212, a database (DB) server 213, a switch 214, and a switch 215. The switch 214 is connected to a network 204 such as the Internet.

The client system 201 is a system to be analyzed. The client system 201 is, for example, an accounting system or a human resources system. The web server 211 provides display of HTML and object to a web browser in software executed at a client connected to the network 204. The application server 212 is a server acting as a bridge between the web server 211 and the DB server 213, and performs data processing and so on. The DB server 213 accumulates information stored in the client system 201.

The system visualizing apparatus 202 aggregates packets from the switch 214 and the switch 215 in the client system 201 and then assembles the packets as messages, and analyzes the messages. The system visualizing apparatus 202 analyzes a data flow between servers and analyzes an average response time between servers. For example, the system visualizing apparatus 202 classifies the messages as protocols such as HTTP and IIOP and, for each protocol, analyzes an average message response time, details of the message classification results, and so forth.

The administrator terminal 203 instructs the system visualizing apparatus 202 to analyze the client system 201. For example, when a trouble occurs in the client system 201 or as part of capacity planning, the administrator terminal 203 instructs the system visualizing apparatus 202 to analyze the client system 201 by operation of an administrator using the administrator terminal 203. The administrator terminal 203 then displays the analysis results.

(Hardware of the Classification Pattern Creating Apparatus 100)

Figure 3:
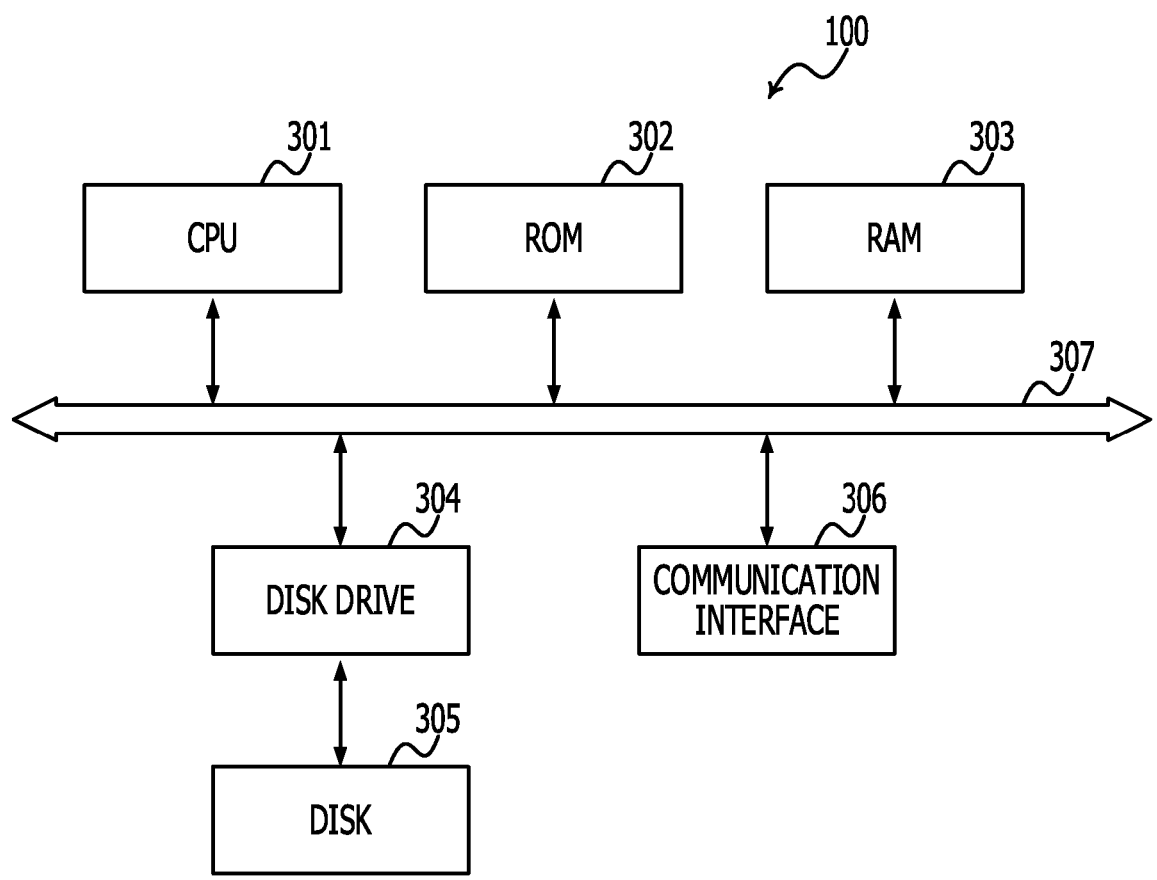
FIG. 3 depicts an example of hardware structure of the classification pattern creating apparatus.

FIG. 3 depicts an example of hardware structure of the classification pattern creating apparatus. By using FIG. 3, an example of hardware structure of the classification pattern creating apparatus 100 is described below. In FIG. 3, the classification pattern creating apparatus 100 includes a central processing unit (CPU) 301, a read only memory (ROM) 302, and a random access memory (RAM) 303. Also, the classification pattern creating apparatus 100 includes a disk drive 304 and a disk 305, and a communication interface 306. Furthermore, the CPU 301, the ROM 302, the RAM 303, the disk drive 304, and the communication interface 306 are connected to one another via a bus 307.

The CPU 301 is a computing processing apparatus that governs overall control of the classification pattern creating apparatus 100. The ROM 302 is a non-volatile memory having a program such as a boot program stored therein. The RAM 303 is a volatile memory that is used as a work area of the CPU 301.

The disk drive 304 is a control apparatus responsible for reading and writing data with respect to the disk 305 by following the control of the CPU 301. As the disk drive 304, for example, a magnetic disk drive, a solid-state drive, or the like may be adopted. The disk 305 is a non-volatile memory having stored therein data written under the control of the disk drive 304. For example, when the disk drive 304 is a magnetic disk drive, a magnetic disk may be adopted as the disk 305. Also, when the disk drive 304 is a solid-state drive, a semiconductor device memory may be adopted as the disk 305.

The communication interface 306 is a control apparatus that is responsible for an internal interface with a network and controls inputs and outputs of data from and to another apparatus. The communication interface 306 is connected to another apparatus via the network. As the communication interface 306, for example, a modem, an LAN adaptor, or the like may be adopted.

The system visualizing apparatus 202, the web server 211, the application server 212, the DB server 213, the switch 214, and the switch 215 have a hardware structure similar to that of the classification pattern creating apparatus 100. The administrator terminal 203 has a CPU, a ROM, a RAM, a disk drive, a disk, a keyboard, and a mouse.

(Functions of the System Visualizing Apparatus 202 and the Classification Pattern Creating Apparatus 100)

Figure 4:
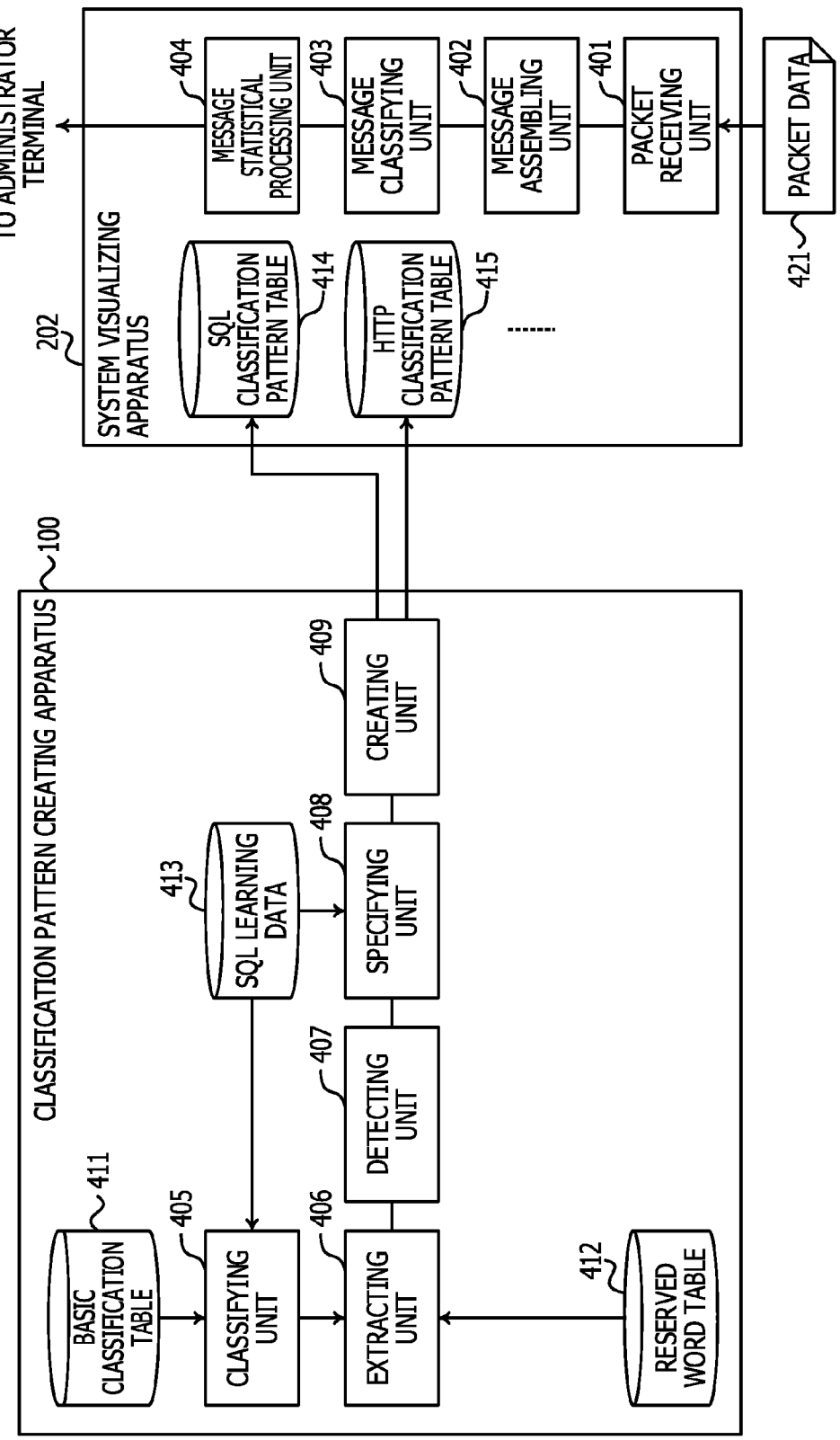
FIG. 4 depicts an example of functional structure of the system visualizing apparatus and the classification pattern creating apparatus.

Next, functions of the system visualizing apparatus 202 and the classification pattern creating apparatus 100 are described. FIG. 4 depicts an example of functional structure of the system visualizing apparatus and the classification pattern creating apparatus. The system visualizing apparatus 202 includes a packet receiving unit 401, a message assembling unit 402, a message classifying unit 403, and a message statistical processing unit 404. With the CPU of the system visualizing apparatus 202 executing a program stored in a storage apparatus, the functions of the packet receiving unit 401, the message assembling unit 402, the message classifying unit 403, and the message statistical processing unit 404 are each performed.

The classification pattern creating apparatus 100 also includes a classifying unit 405, an extracting unit 406, a detecting unit 407, a specifying unit 408, and a creating unit 409. With the CPU 301 executing a program stored in a storage apparatus, the functions of the classifying unit 405, the extracting unit 406, the detecting unit 407, the specifying unit 408, and the creating unit 409 are each performed. The storage apparatus is, for example, the ROM 302, the RAM 303, or the disk 305 depicted in FIG. 3. Also, the functions of the classifying unit 405, the extracting unit 406, the detecting unit 407, the specifying unit 408, and the creating unit 409 may be implemented with the CPU of the system visualizing apparatus 202 executing a program stored in a storage apparatus.

Furthermore, the classification pattern creating apparatus 100 is accessible to a basic classification table 411, a reserved word table 412, SQL learning data 413, an SQL classification pattern table 414, an HTTP classification pattern table 415, and, although not depicted in FIG. 4, a classification pattern table other than the SQL classification pattern table 414 and the HTTP classification pattern table 415. The basic classification table 411, the reserved word table 412, and the SQL learning data 413 are stored in a storage apparatus such as the RAM 303 or the disk 305. Also, the SQL classification pattern table 414, the HTTP classification pattern table 415, and the classification pattern table of a protocol other than the protocols of the SQL classification pattern table 414 and the HTTP classification pattern table 415 are stored in a storage apparatus such as the RAM or disk of the system visualizing apparatus 202.

The basic classification table 411 will be described further below by using FIG. 5. The reserved word table 412 will be described further below by using FIG. 6. The SQL classification pattern table 414 will be described further below by using FIG. 8, FIG. 14, and FIG. 18.

The SQL learning data 413 is a message transmitted or received by a server of the client system 201. The SQL learning data 413 may be a message that requests a process from each server in the client system 201. The SQL learning data 413 will be described further below by using FIG. 7 and FIG. 13.

The packet receiving unit 401 receives packet data 421 transmitted and received at the client system 201 via the switch 214 and the switch 215. The message assembling unit 402 assembles the packet data 421 received by the packet receiving unit 401 to create a message. The message classifying unit 403 classifies the message assembled by the message assembling unit 402 in accordance with the SQL classification pattern table 414, the HTTP classification pattern table 415, or the like. The message statistical processing unit 404 statistically analyzes the message classified by the message classifying unit 403. The message statistical processing unit 404 transmits the analysis results to the administrator terminal 203.

The classifying unit 405 classifies SQL data of the SQL learning data 413 in accordance with a classification pattern in the basic classification table. The classification results are stored in a storage apparatus such as the RAM 303 or the disk 305.

The extracting unit 406 extracts a partial character string formed of a reserved word and a character string immediately previous or subsequent to the reserved word in SQL data included in an SQL data group conforming to a first classification pattern. Examples of extraction will be described further below by using FIG. 10, FIG. 15, and FIG. 19. Details of the extracted partial character string or a pointer indicating the partial character string is stored in a storage apparatus such as the RAM 303 or the disk 305.

Based on the partial character string extracted by the extracting unit 406, the detecting unit 407 detects SQL data including the partial character string from the SQL data group. Examples of detection will be described further below by using FIG. 10, FIG. 15, and FIG. 19. The detected SQL data or an address where the SQL data is stored is stored in a storage apparatus such as the RAM 303 or the disk 305.

Based on the SQL data detected by the detecting unit 407, the specifying unit 408 specifies any partial character string from the partial character string extracted by the extracting unit 406.

The specifying unit 408 may specify any partial character string from the extracted partial character string based on the number of pieces of SQL data detected by the detecting unit 407 for each partial character string. An example of specification will be described further below by using FIG. 10. For example, the specifying unit 408 may specify a partial character string with the maximum number of pieces of SQL data detected by the detecting unit 407. Alternatively, the specifying unit 408 may specify a partial character string with the number of pieces of SQL data detected by the detecting unit 407 being half or more of the number of pieces of data in the SQL data group detected by the detecting unit 407.

The specifying unit 408 may specify a partial character string from the extracted partial character string based on a response time of the SQL data detected by the detecting unit 407 with reference to the SQL learning data 413. The response time of the SQL data detected by the detecting unit 407 may be an average value or maximum value of response times of SQL data detected for respective partial character strings. An example of specification will be described further below by using FIG. 15.

Also, the specifying unit 408 may specify any partial character string from the detected partial character string based on a total response time acquired by accumulating response times of SQL data detected by the detecting unit 407 for respective partial character strings with reference to the SQL learning data 413. An example of specification will be described further below by using FIG. 19.

The creating unit 409 creates a second classification pattern for classifying an SQL data group based on the first classification pattern and the partial character string specified by the specifying unit 408. Examples of creation will be described further below by using FIG. 10, FIG. 15, and FIG. 19. The created second classification pattern is stored in the SQL classification pattern table 414 or the like.

The classification pattern creating apparatus 100 decomposes a classification pattern in the basic classification table 411 with reference to the SQL learning data 413. In the following, a first decomposition example, a second decomposition example, and a third decomposition example are described as examples of decomposition of a basic classification pattern. Among reference numerals, a reference numeral provided with "-ex1" indicates that a component with that reference numeral relates to the first decomposition example. Similarly, a reference numeral provided with "-ex2" indicates that a component with that reference numeral relates to the second decomposition example, and a reference numeral provided with "-ex3" indicates that a component with that reference numeral relates to the third decomposition example.

First Decomposition Example

The first decomposition example is an example in which a classification pattern is decomposed based on the number of pieces of SQL data. In the following, the first decomposition example is described by using FIG. 5 to FIG. 12.

FIG. 5 depicts an example of details stored in the basic classification table in the first decomposition example. A basic classification table 411-ex1 stores a first classification pattern formed of a reserved word defined by the protocol and a character string in which a set of character strings paired with that reserved word are represented by regular expressions.

The basic classification table 411-ex1 depicted in FIG. 5 has records 501-1 to 501-3. The basic classification table 411-ex1 includes two fields of "item number" and "classification pattern". In the field "item number", a pattern identifying number is stored. In the field "classification pattern", the most primitive SQL pattern applicable in any system is stored. Also, in the following description and the drawings, the classification pattern of a record is indicated by the reference character of that record with a character "p" provided at the tail end of the reference character. For example, a classification pattern 501-1p is "/^SELECT(.*)FROM(.*)WHERE(.*)$/".

For example, the record 501-1 indicates that a classification pattern with an item number of 1 is "/^SELECT(.*)FROM(.*)WHERE(.*)$/".

Also, each SQL pattern in the basic classification table 411-ex1 is represented by using regular expressions. For example, the classification pattern 501-1p conforms to a character string with "SELECT" at the head, followed by any character 0 or more times, then by "FROM", then by any character 0 or more times, then by "WHERE", and then by any character 0 or more times to end.

As a classification pattern conforming to all pieces of SQL data, the basic classification table 411-ex1 may have "/^(.*)$/" stored therein.

Figure 6:
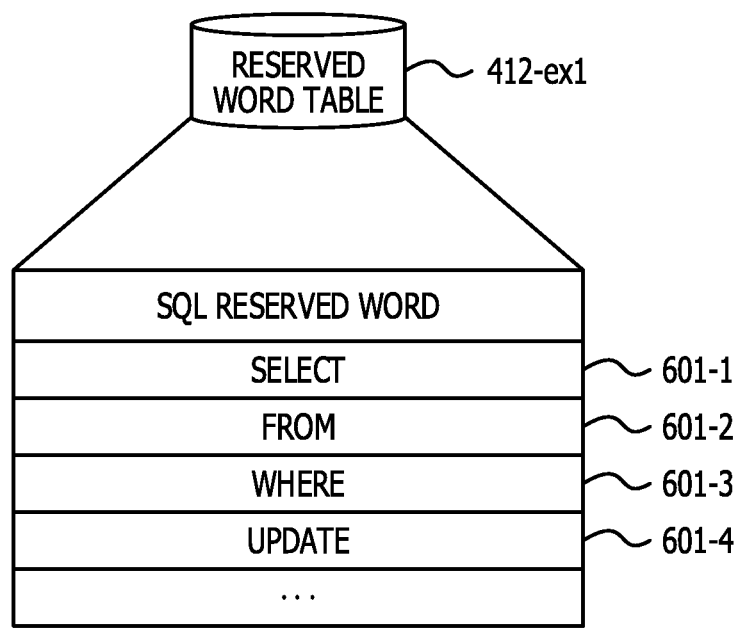
FIG. 6 depicts an example of details stored in a reserved word table in the first decomposition example.

FIG. 6 depicts an example of details stored in a reserved word table in the first decomposition example. A reserved word table 412-ex1 is a table having reserved words stored therein. The reserved word table 412-ex1 depicted in FIG. 6 has records 601-1 to 601-4. The reserved word table 412-ex1 includes one field of "SQL reserved word". In the field "SQL reserved word", reserved words defined by SQL are stored.

For example, the record 601-1 indicates that "SELECT" is an SQL reserved word. Also, as an example of HTTP, "GET", "POST", and so on not depicted in FIG. 6 are stored in the records of the reserved word table 412-ex1.

Figure 7:
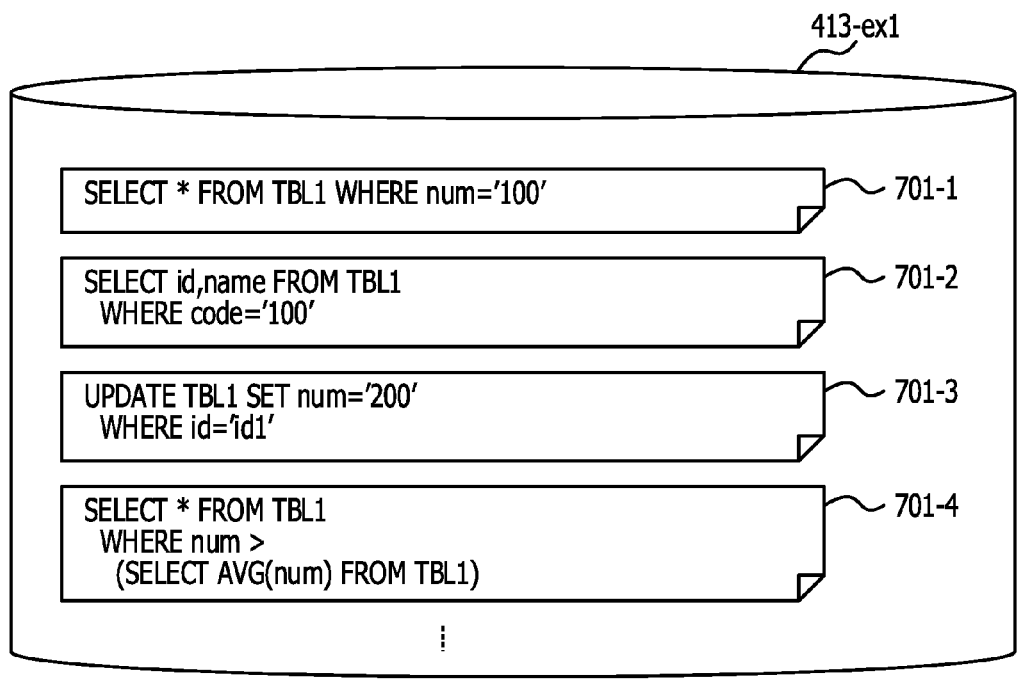
FIG. 7 depicts an example of SQL learning data in the first decomposition example.

FIG. 7 depicts an example of SQL learning data in the first decomposition example. SQL learning data 413-ex1 is SQL data for use in creating a classification pattern. The SQL learning data 413-ex1 is SQL data previously collected in the client system 201. The SQL learning data 413-ex1 depicted in FIG. 7 includes SQL data 701-1 to 701-4.

For example, the SQL data 701-1 indicates "SELECT * FROM TBL1 WHERE num='100'".

Figure 8:
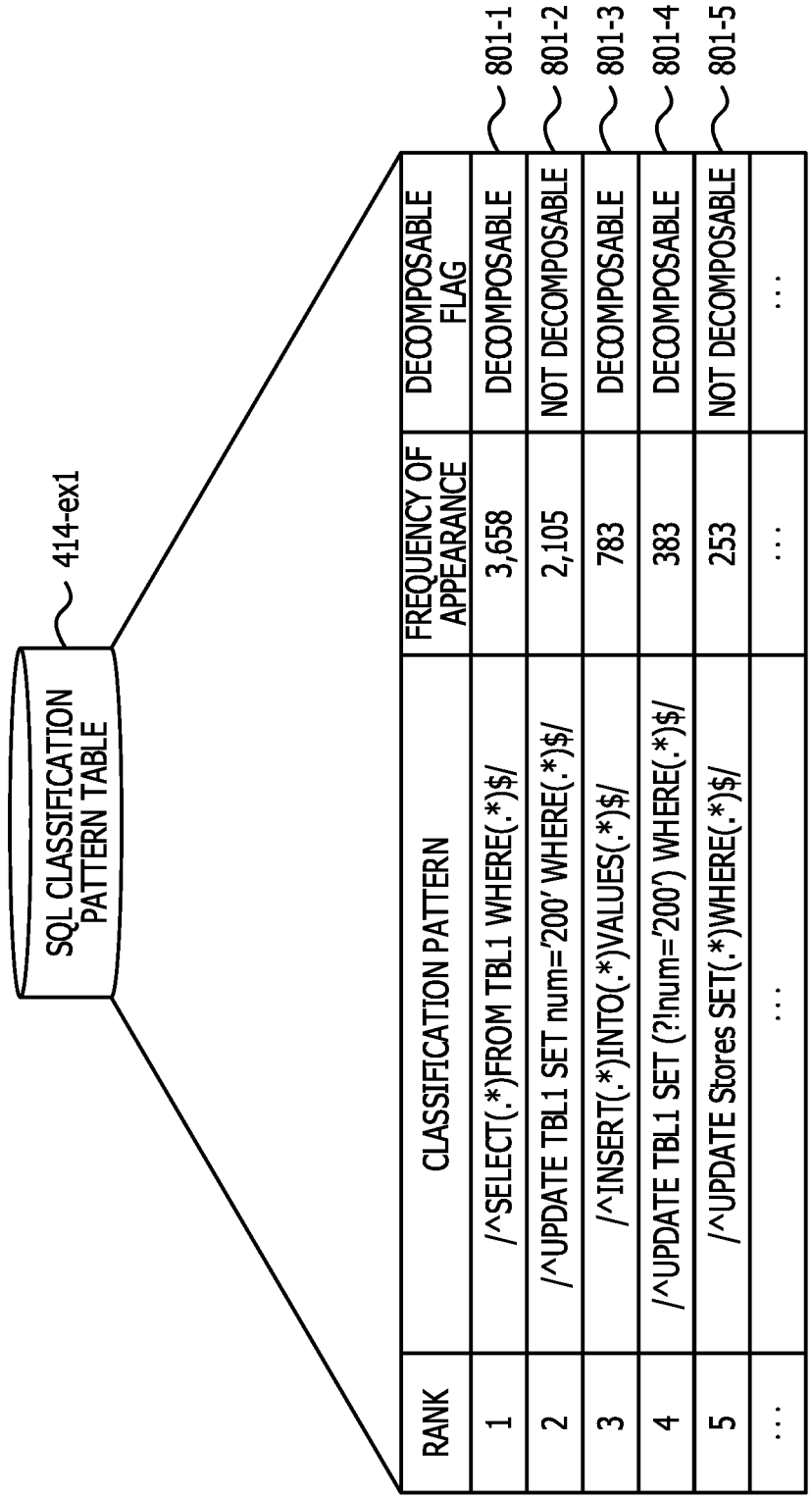
FIG. 8 depicts an example of details stored in an SQL classification pattern table in the first decomposition example.

FIG. 8 depicts an example of details stored in an SQL classification pattern table in the first decomposition example. An SQL classification pattern table 414-ex1 represents information where classification patterns created according to the first decomposition example are stored.

The SQL classification pattern table 414-ex1 depicted in FIG. 8 has records 801-1 to 801-5. The SQL classification pattern table 414-ex1 includes four fields of "rank", "classification pattern", "frequency of appearance", and "decomposable flag".

In the field "rank", the rank of the classification pattern is stored. In the field "classification pattern", the created classification pattern is stored. In the field "frequency of appearance", the frequency of SQL data in the SQL learning data 413-ex1 classified as the relevant classification pattern is stored. For example, if the SQL learning data 413-ex1 has 1000 pieces of SQL data, the number of pieces of SQL data classified as the relevant classification pattern among 1000 pieces of SQL data is stored. In the field "decomposable flag", an identifier indicating whether the relevant classification pattern is decomposable into two or more classification patterns is stored. There are two identifiers, that is, an identifier of "decomposable" indicating that the relevant classification pattern is decomposable and an identifier of "not decomposable" indicating that the relevant classification pattern is not decomposable.

For example, the record 801-1 indicates that, as a classification pattern ranked first, the classification pattern as which SQL data in the SQL learning data 413-ex1 is most classified is "/^SELECT(.*)FROM TBL1 WHERE(.*)$/". Furthermore, the record 801-1 indicates that the frequency of appearance of the classification pattern ranked first is 3658 and that classification pattern is decomposable.

Figure 9:
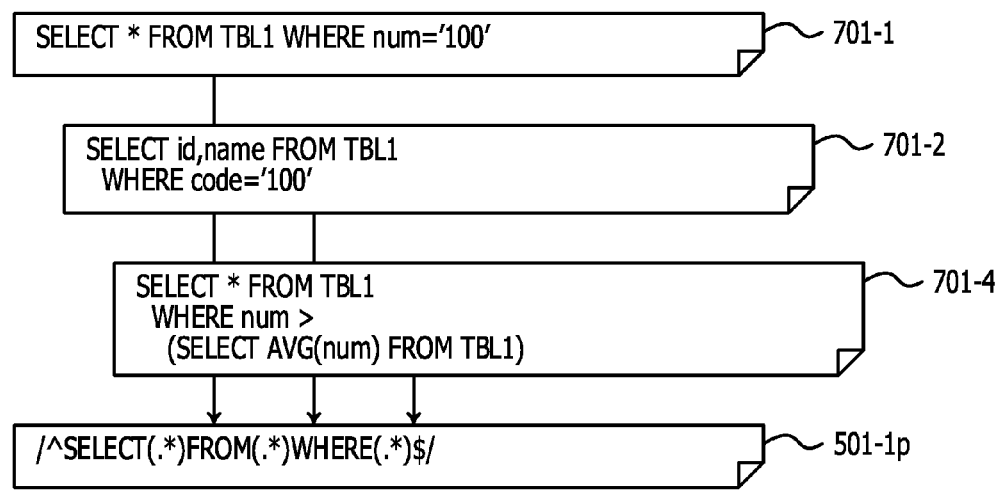
FIG. 9 depicts an example of classification of the SQL learning data in the first decomposition example.

FIG. 9 depicts an example of classification of the SQL learning data in the first decomposition example. The classification pattern creating apparatus 100 first classifies SQL data in the SQL learning data 413-ex1 for each classification pattern in the basic classification table 411-ex1. The classification pattern creating apparatus 100 determines whether each piece of SQL data in the SQL learning data 413-ex1 hits any classification pattern in the basic classification table 411-ex1. When the SQL data hits any classification pattern, the classification pattern creating apparatus 100 classifies the relevant SQL data as the hit classification pattern.

In the example of FIG. 9, for example, the classification pattern creating apparatus 100 classifies the SQL data 701-1, 701-2, and 701-4 as the classification pattern 501-1p.

Figure 10:
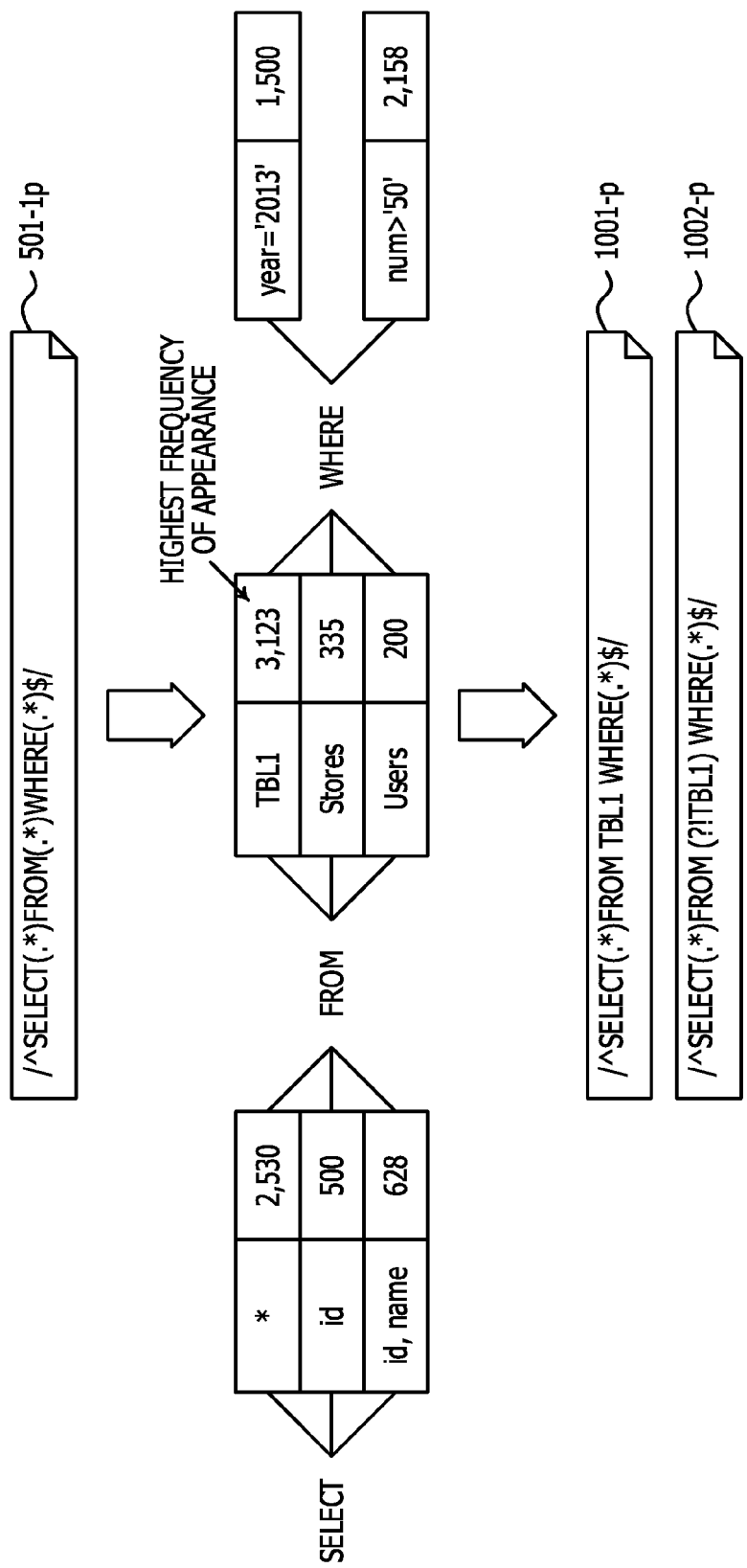
FIG. 10 depicts an example of decomposition of a classification pattern in the first decomposition example.

FIG. 10 depicts an example of decomposition of a classification pattern in the first decomposition example. After classifying the SQL data in the SQL learning data 413-ex1, the classification pattern creating apparatus 100 decomposes a classification pattern with the highest frequency of appearance.

In the example of FIG. 10, the classification pattern 501-1p is the classification pattern with the highest frequency of appearance, and the number of pieces of SQL data classified as the classification pattern 501-1p in the SQL learning data 413-ex1 is 3658. Here, from each SQL data of the SQL data group conforming to the classification pattern 501-1p, the classification pattern creating apparatus 100 extracts a partial character string formed of a reserved word and a character string immediately previous or subsequent to the reserved word.

In the example of FIG. 10, the reserved words in the SQL data group conforming to the classification pattern 501-1p are "SELECT", "FROM", and "WHERE". Character strings immediately subsequent to "SELECT" in each SQL data of the SQL data group conforming to the classification pattern 501-1p are "*", "id", and "id, name". Also, character strings immediately subsequent to "FROM" in each SQL data of the SQL data group conforming to the classification pattern 501-1p are "TBL1" "Stores", and "Users". Furthermore, character strings immediately subsequent to "WHERE" in each SQL data of the SQL data group conforming to the classification pattern 501-1p are "year='2013'" and "num>'50'".

Therefore, the classification pattern creating apparatus 100 extracts "SELECT *", "SELECT id", and "SELECT id, name" as partial character strings each formed of the reserved word "SELECT" and a character string immediately subsequent to the reserved word. Also, the classification pattern creating apparatus 100 extracts "FROM TBL1", "FROM Stores", and "FROM Users" as partial character strings each formed of the reserved word "FROM" and a character string immediately subsequent to the reserved word. Furthermore, the classification pattern creating apparatus 100 extracts "WHERE year='2013'" and "WHERE num>'50'" as partial character strings each formed of the reserved word "WHERE" and a character string immediately subsequent to the reserved word.

Subsequently, the classification pattern creating apparatus 100 specifies a partial character string with a maximum number of pieces of SQL data including the partial character string.

In the example of FIG. 10, the numbers of pieces of SQL data including "SELECT *", "SELECT id", and "SELECT id, name" detected by the classification pattern creating apparatus 100 from the SQL learning data 413-ex1 are 2530, 500, and 628, respectively. Also, the numbers of pieces of SQL data including "FROM TBL1", "FROM Stores", and "FROM Users" detected by the classification pattern creating apparatus 100 from the SQL learning data 413-ex1 are 3123, 335, and 200, respectively. Furthermore, the numbers of pieces of SQL data including "WHERE year='2013'" and "WHERE num>'50'" detected by the classification pattern creating apparatus 100 from the SQL learning data 413-ex1 are 1500 and 2158, respectively.

Therefore, the classification pattern creating apparatus 100 specifies "FROM TBL1" as a partial character string with the maximum number of pieces of SQL data including the partial character string. The classification pattern creating apparatus 100 then uses the specified partial character string to create a new classification pattern.

The classification pattern creating apparatus 100 creates a classification pattern 1001-p for classification of SQL data including the most-frequently-appearing partial character string among the SQL data classified with the classification pattern 501-1p. The classification pattern creating apparatus 100 also creates a classification pattern 1002-p for classification of SQL data including a partial character string except the most-frequently-appearing partial character string among the SQL data classified with the classification pattern 501-1p. In the classification pattern 1002-p, "(?!TBL1)" is a regular expression for detecting a partial character string except "TBL1".

Here, it is assumed that the specified partial character string is "WHERE num>(SELECT AVG(num) FROM TBL1)" in the SQL data 701-4. In this case, the classification pattern creating apparatus 100 creates "SELECT(.*)FROM (.*)WHERE num>(SELECT AVG(num) FROM TBL1)" as a classification pattern for classifying SQL data including the most-frequently-appearing partial character string. As such, the classification pattern creating apparatus 100 registers even SQL data in a nested structure as a classification pattern.

Figure 11:
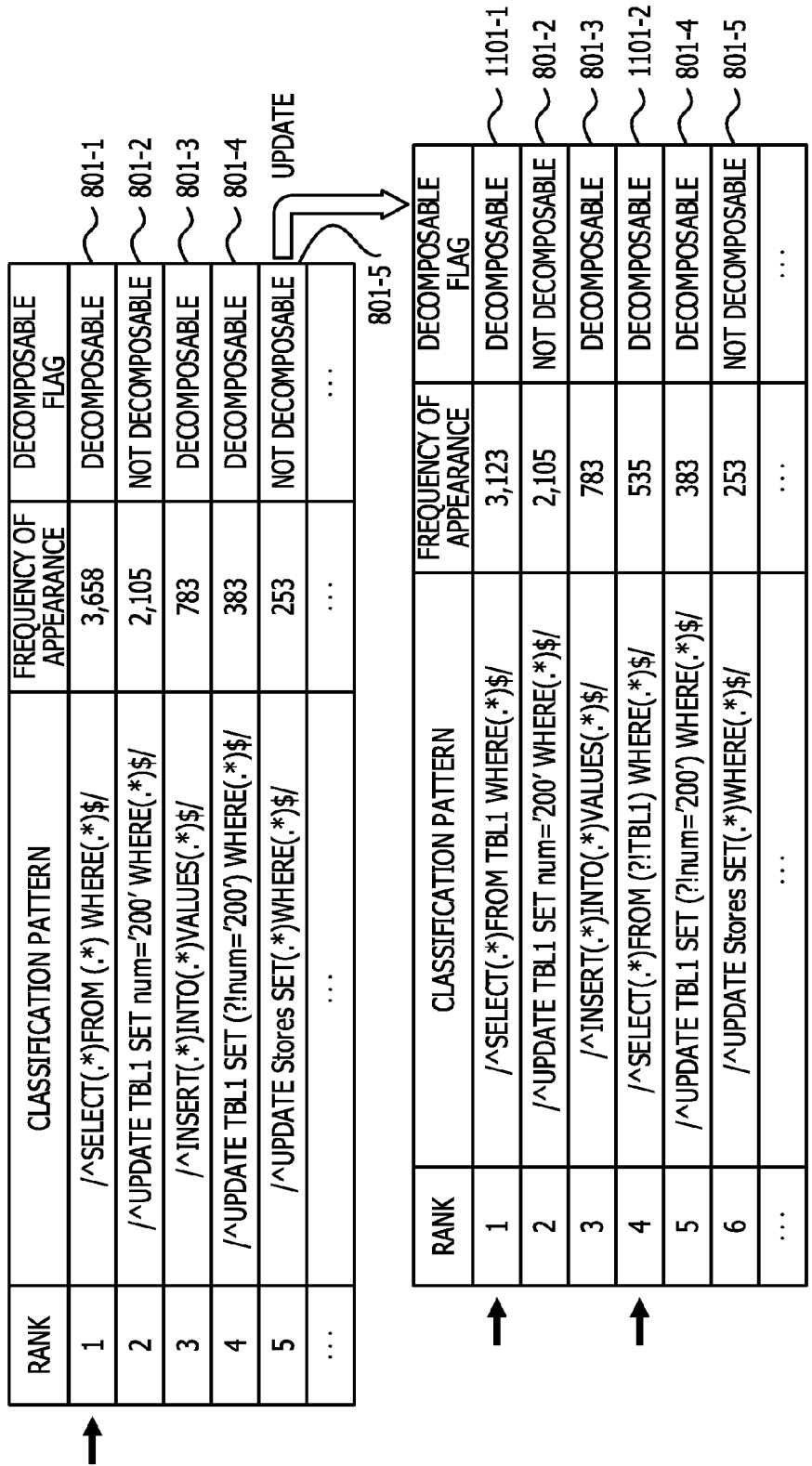
FIG. 11 depicts an example of updating an SQL classification pattern in the first decomposition example.

FIG. 11 depicts an example of updating an SQL classification pattern in the first decomposition example. The classification pattern creating apparatus 100 updates the SQL classification pattern table 414-ex1 so that the classification pattern 501-1p is decomposed into the classification pattern 1001-p and the classification pattern 1002-p.

The classification pattern creating apparatus 100 adds a record 1101-1 having the classification pattern 1001-p to the SQL classification pattern table 414-ex1 as a record ranked first, and adds a record 1101-2 having the classification pattern 1002-p to the SQL classification pattern table 414-ex1 as a record ranked fourth. The frequency of appearance of the record 1101-2 is 535, which is the sum of 335 and 200, which are the number of pieces of SQL data where the character string after "FROM" and before "WHERE" in the SQL learning data 413-ex1 is "Stores" and the number of those where the character string described above is "Users", respectively. The classification pattern creating apparatus 100 then deletes the record 801-1 from the SQL classification pattern table 414-ex1.

Figure 12:
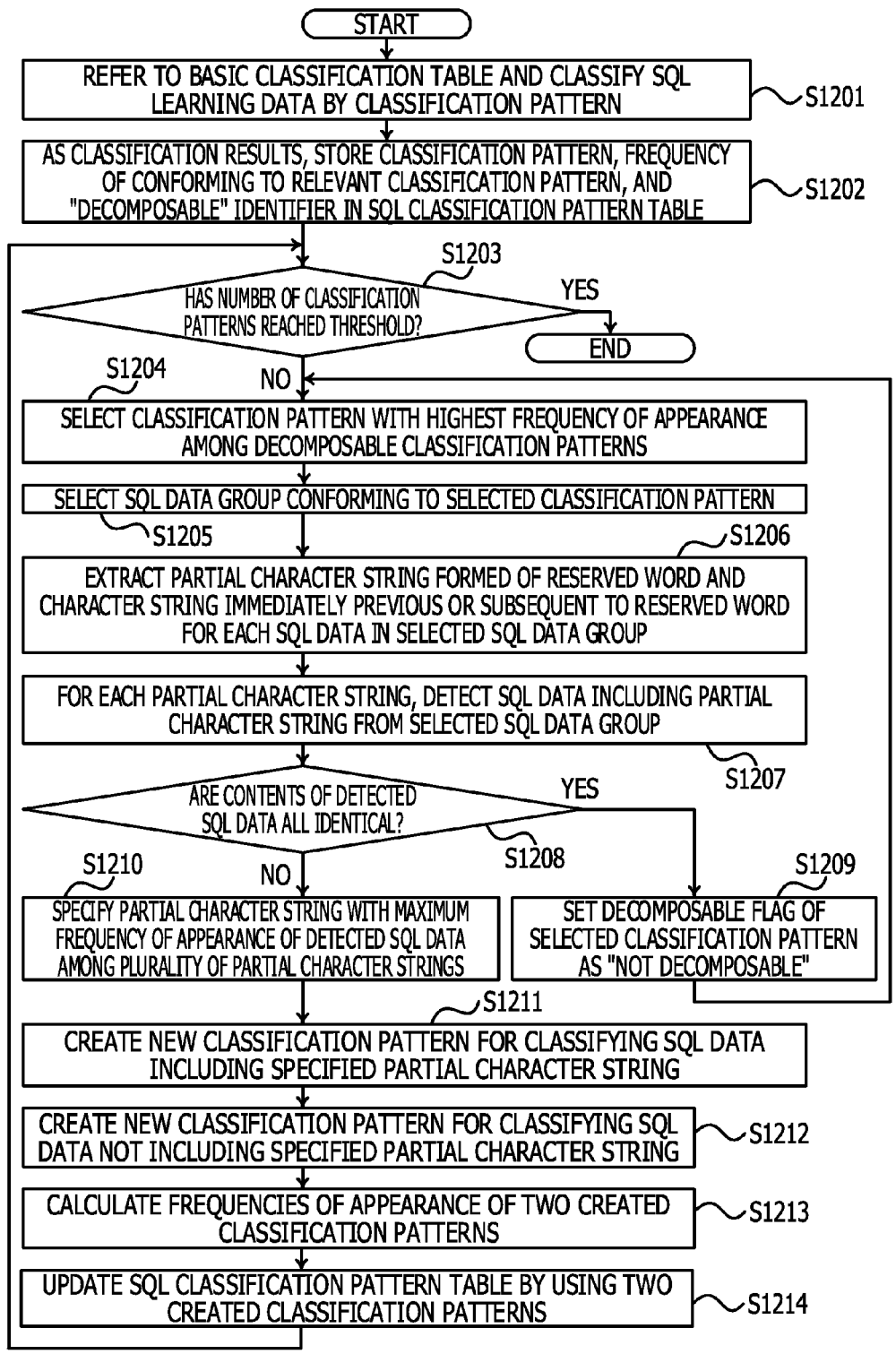
FIG. 12 is a flowchart of an example of a procedure of a classification pattern creating process in the first decomposition example.

FIG. 12 is a flowchart of an example of a procedure of a classification pattern creating process in the first decomposition example. The classification pattern creating process in the first decomposition example is a process of decomposing a classification pattern by dividing the classification pattern in the basic classification table 411 according to the first decomposition example.

The classification pattern creating apparatus 100 refers to the basic classification table 411-ex1 and classifies the SQL learning data by classification pattern (step S1201). Next, as the classification results, the classification pattern creating apparatus 100 stores a classification pattern, frequency of appearance of SQL data conforming to the relevant classification pattern in the SQL learning data, and the identifier "decomposable" in the SQL classification pattern table 414-ex1 (step S1202). Subsequently, the classification pattern creating apparatus 100 determines whether the number of classification patterns has reached a threshold (step S1203). If the number of classification patterns has reached the threshold (Yes at step S1203), the classification pattern creating apparatus 100 ends the classification pattern creating process in the first decomposition example.

If the number of classification patterns has not reached the threshold (No at step S1203), the classification pattern creating apparatus 100 selects a classification pattern with the highest frequency of appearance among the decomposable classification patterns (step S1204). Subsequently, the classification pattern creating apparatus 100 selects an SQL data group conforming to the selected classification pattern (step S1205). Next, the classification pattern creating apparatus 100 extracts a partial character string formed of a reserved word and a character string immediately previous or subsequent to the reserved word for each SQL data in the selected SQL data group (step S1206). Subsequently, for each extracted partial character string, the classification pattern creating apparatus 100 detects SQL data including the partial character string from the selected SQL data group (step S1207).

Next, the classification pattern creating apparatus 100 determines whether the contents of the detected SQL data are all identical (step S1208). When the contents of the detected SQL data are all identical (Yes at step S1208), the classification pattern creating apparatus 100 sets a decomposable flag of the selected classification pattern as "not decomposable" (step S1209). The classification pattern creating apparatus 100 then proceeds to the process at step S1204.

When the contents of the detected SQL data are not all identical (No at step S1208), the classification pattern creating apparatus 100 specifies a partial character string with the maximum frequency of appearance of the detected SQL data among a plurality of partial character strings (step S1210). Next, the classification pattern creating apparatus 100 creates a new classification pattern for classifying SQL data including the specified partial character string (step S1211). Subsequently, the classification pattern creating apparatus 100 creates a new classification pattern for classifying SQL data not including the specified partial character string (step S1212).

Next, the classification pattern creating apparatus 100 calculates frequencies of appearance of these two created classification patterns (step S1213). Subsequently, the classification pattern creating apparatus 100 updates the SQL classification pattern table 414-ex1 by using these two created classification patterns (step S1214). The classification pattern creating apparatus 100 then proceeds to the process at step S1203. By performing the classification pattern creating process in the first decomposition example, the classification pattern creating apparatus 100 decomposes a classification pattern based on the frequency of appearance of SQL data.

Second Decomposition Example

A second decomposition example is an example in which a classification pattern is decomposed based on an average response time. In the following, the second decomposition example is described by using FIG. 13 to FIG. 17. The basic classification table 411 and the reserved word table 412 in the second decomposition example are identical to the basic classification table 411-ex1 and the reserved word table 412-ex1 in the first decomposition example, and therefore are not described herein.

Figure 13:
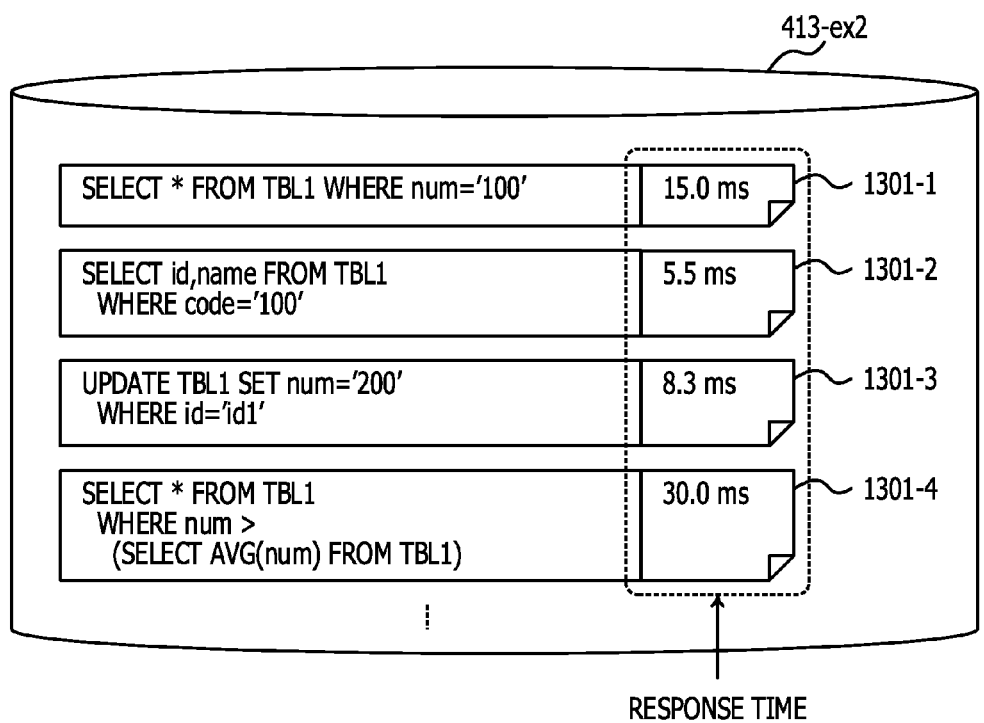
FIG. 13 depicts an example of SQL learning data in a second decomposition example.

FIG. 13 depicts an example of SQL learning data in the second decomposition example. SQL learning data 413-ex2 is SQL data for use in creating a classification pattern. The SQL learning data 413-ex2 depicted in FIG. 13 includes SQL data 1301-1 to 1301-4. The SQL data 1301-1 to 1301-4 are each provided with a response time. The response time is a time period from the time when the system visualizing apparatus detects each SQL data to the time when a server transmits a response message corresponding to the SQL data and the system visualizing apparatus receives the response message.

For example, the SQL data 1301-1 indicates that a response message came 15.0 ms after "SELECT * FROM TBL1 WHERE num='100'" is detected.

Figure 14:
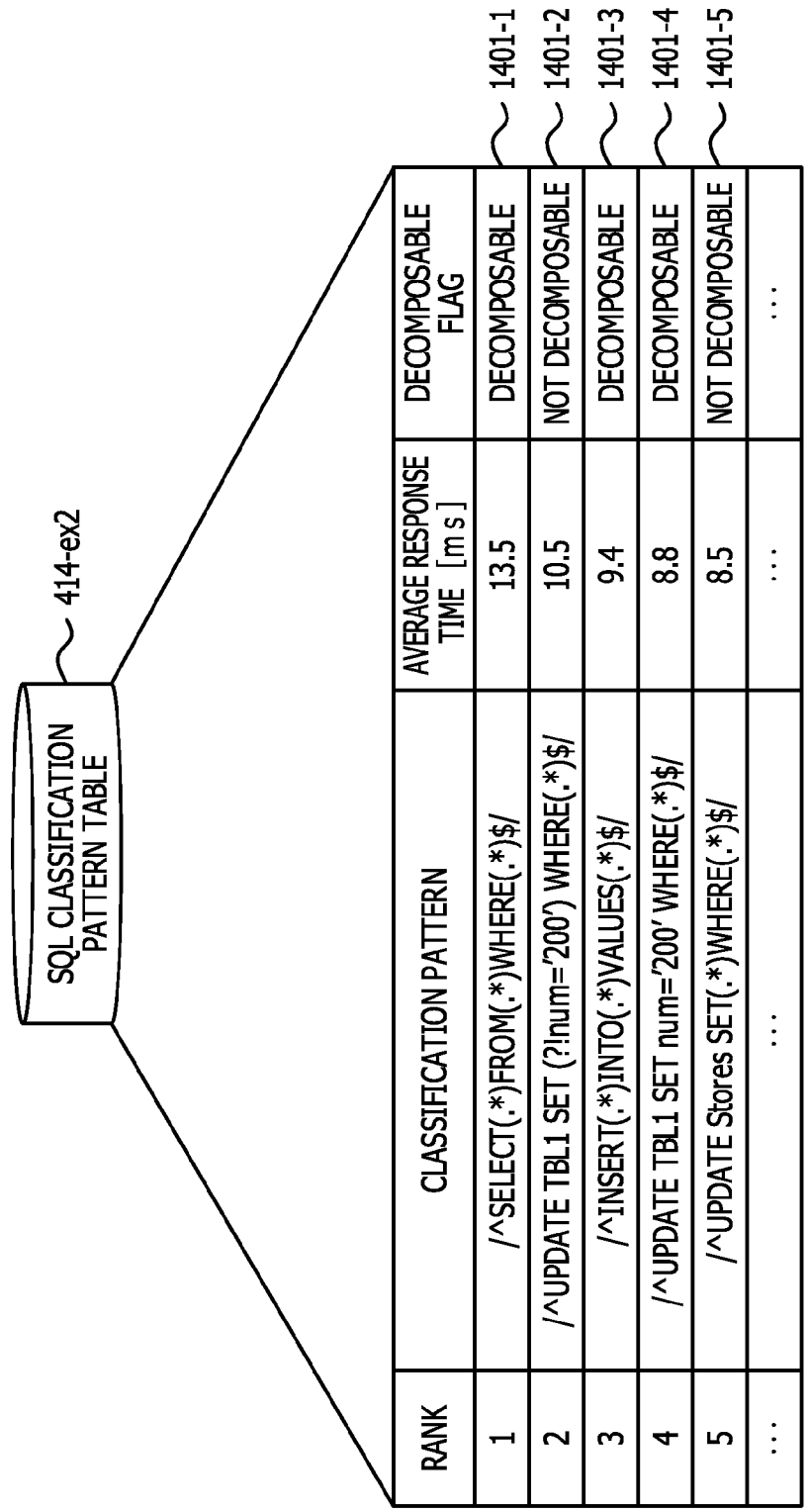
FIG. 14 depicts an example of details stored in an SQL classification pattern table in the second decomposition example.

FIG. 14 depicts an example of details stored in an SQL classification pattern table in the second decomposition example. An SQL classification pattern table 414-ex2 represents information where classification patterns created according to the second decomposition example are stored.

The SQL classification pattern table 414-ex2 depicted in FIG. 14 has records 1401-1 to 1401-5. The SQL classification pattern table 414-ex2 includes a field "average response time" in place of the field "frequency of appearance" included in the SQL classification pattern table 414-ex1.

In the field "average response time", an average value of response times of SQL data classified as the relevant classification pattern in the SQL data of the SQL learning data 413-ex1 is stored. For example, the record 1401-1 indicates that the average response time of SQL data classified as the classification pattern 1401-1p as a classification ranked first is 13.5 ms, and that classification pattern is decomposable.

Figure 15:
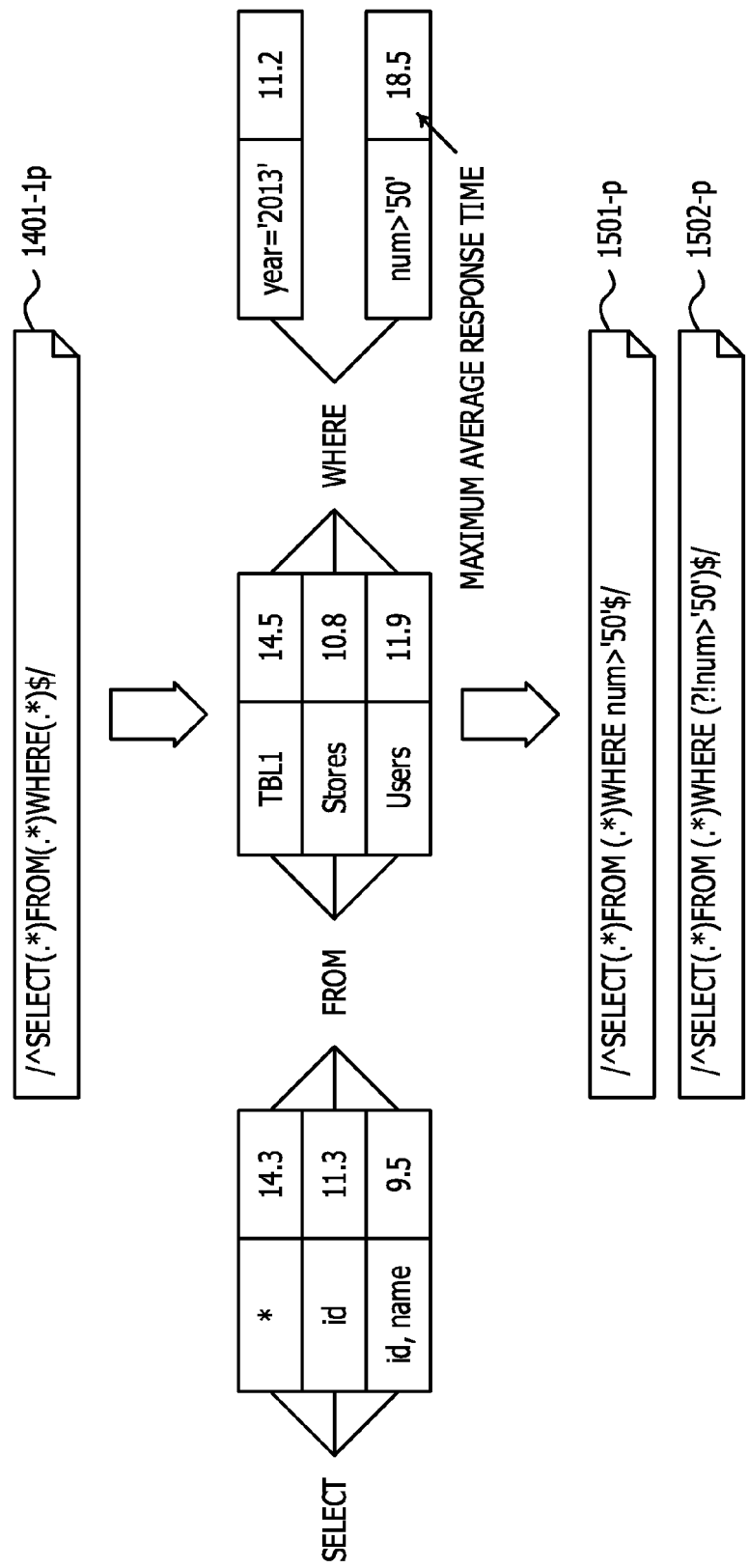
FIG. 15 depicts an example of decomposition of a classification pattern in the second decomposition example.

FIG. 15 depicts an example of decomposition of a classification pattern in the second decomposition example. After classifying the SQL data in the SQL learning data 413-ex2, the classification pattern creating apparatus 100 decomposes the classification pattern with the longest average response time.

In the example of FIG. 15, it is assumed that the classification pattern 1401-1p is a classification pattern with the longest average response time and the average response time of SQL data classified as the classification pattern 1401-1p in the SQL learning data 413-ex2 is 13.5 ms. In this case, the classification pattern creating apparatus 100 extracts a partial character string formed of a reserved word and a character string immediately previous or subsequent to the reserved word for each SQL data in the SQL data group conforming to the classification pattern 1401-1p. An example of the extracted partial character is identical to the example described with reference to FIG. 10, and therefore is not described herein.

Subsequently, the classification pattern creating apparatus 100 specifies a partial character string with the maximum average response time of SQL data including the partial character string.

For example, the average response times of SQL data including "SELECT *", "SELECT id", and "SELECT id, name" in the SQL learning data 413-ex2 are 14.3 ms, 11.3 ms, and 9.5 ms, respectively. Also, the average response times of SQL data including "FROM TBL1", "FROM Stores", and "FROM Users" in the SQL learning data 413-ex2 are 14.5 ms, 10.8 ms, and 11.9 ms, respectively. Furthermore, the average response times of SQL data including "WHERE year='2013'" and "WHERE num>'50'" in the SQL learning data 413-ex2 are 11.2 ms and 18.5 ms, respectively.

Therefore, the classification pattern creating apparatus 100 specifies "WHERE num>'50'" as the partial character string with the maximum average response time of SQL data including the partial character string. The classification pattern creating apparatus 100 then uses the specified partial character string to create a new classification pattern.

The classification pattern creating apparatus 100 creates a classification pattern 1501-p for classifying SQL data including the partial character string with the maximum average response time among SQL data classified with the classification pattern 1401-1p. The classification pattern creating apparatus 100 also creates a classification pattern 1502-p for classifying SQL data including a partial character string except the partial character string with the maximum average response time among the SQL data classified with the classification pattern 1401-1p.

Furthermore, it is assumed that the average response time of "/^(.*)$/" as a classification pattern conforming to all SQL data is maximum. For example, it is assumed that SQL data of "DELETE FROM TBL1" for deleting a record is transmitted as a result of date/time processing and the DB server 213 of the client system 201 takes long time to process "DELETE FROM TBL1". In this case, the classification pattern creating apparatus 100 specifies "DELETE FROM TBL1" or other SQL data conforming to "/^(.*)$/". Then, if the average response time of "DELETE FROM TBL1" is maximum, the classification pattern creating apparatus 100 registers "DELETE FROM TBL1" in the SQL classification pattern table 414-ex2.

Figure 16:
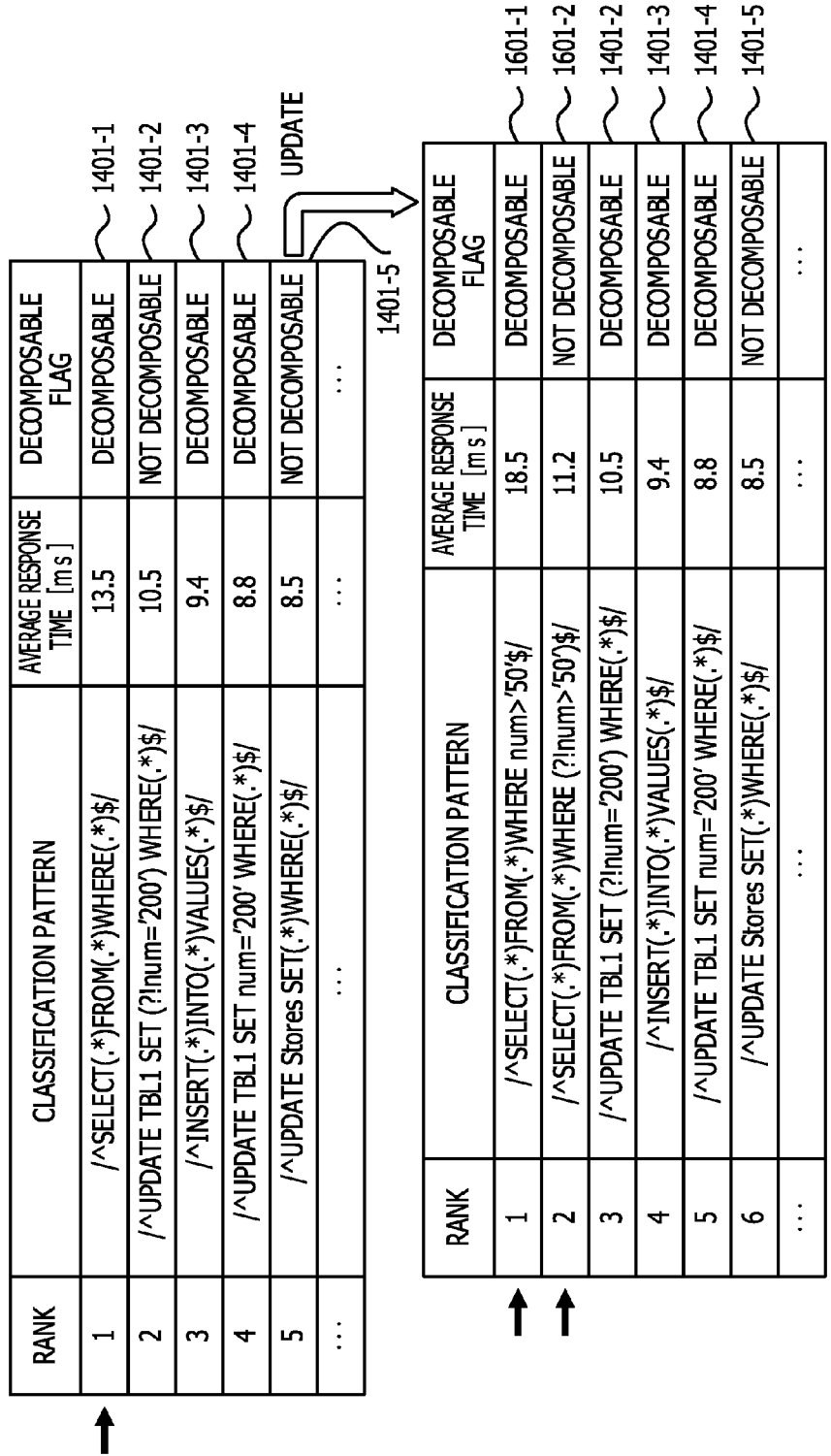
FIG. 16 depicts an example of updating an SQL classification pattern in the second decomposition example.

FIG. 16 depicts an example of updating an SQL classification pattern in the second decomposition example. The classification pattern creating apparatus 100 updates the SQL classification pattern table 414-ex2 so that the classification pattern 1401-1p is decomposed into the classification pattern 1501-p and the classification pattern 1502-p.

The classification pattern creating apparatus 100 adds a record 1601-1 having the classification pattern 1501-p to the SQL classification pattern table 414-ex2 as a record ranked first, and adds a record 1601-2 having the classification pattern 1502-p to the SQL classification pattern table 414-ex2 as a record ranked second. The average response time of the record 1601-2 is 11.2 ms, which is the average response time of SQL data where the character string after "WHERE" in the SQL learning data 413-ex2 is "year='2013'". The classification pattern creating apparatus 100 then deletes the record 1401-1 from the SQL classification pattern table 414-ex2.

In FIG. 16, to calculate an average response time when two or more character strings are present except the character string with the maximum average response time, a weighted average is calculated by using the number of pieces of SQL data having a character string except the character string with the maximum average response time. For example, it is assumed in FIG. 15 that the average response time of SQL data where the character string after "FROM" and before "WHERE" is "TBL1" in the SQL learning data 413-ex2 is maximum. It is further assumed that the number of pieces of SQL data where the character string after "FROM" and before "WHERE" in the SQL learning data 413-*ex*2 is "Stores" is 40 and the number of those where the character string described above is "Users" is 50.

In this case, the classification pattern creating apparatus 100 calculates an average response time of the classification patterns for classifying the SQL data including the character string except the character string with the maximum average response time as (40×10.8+50×11.9)/(40+50)=11.4 ms.

Figure 17:
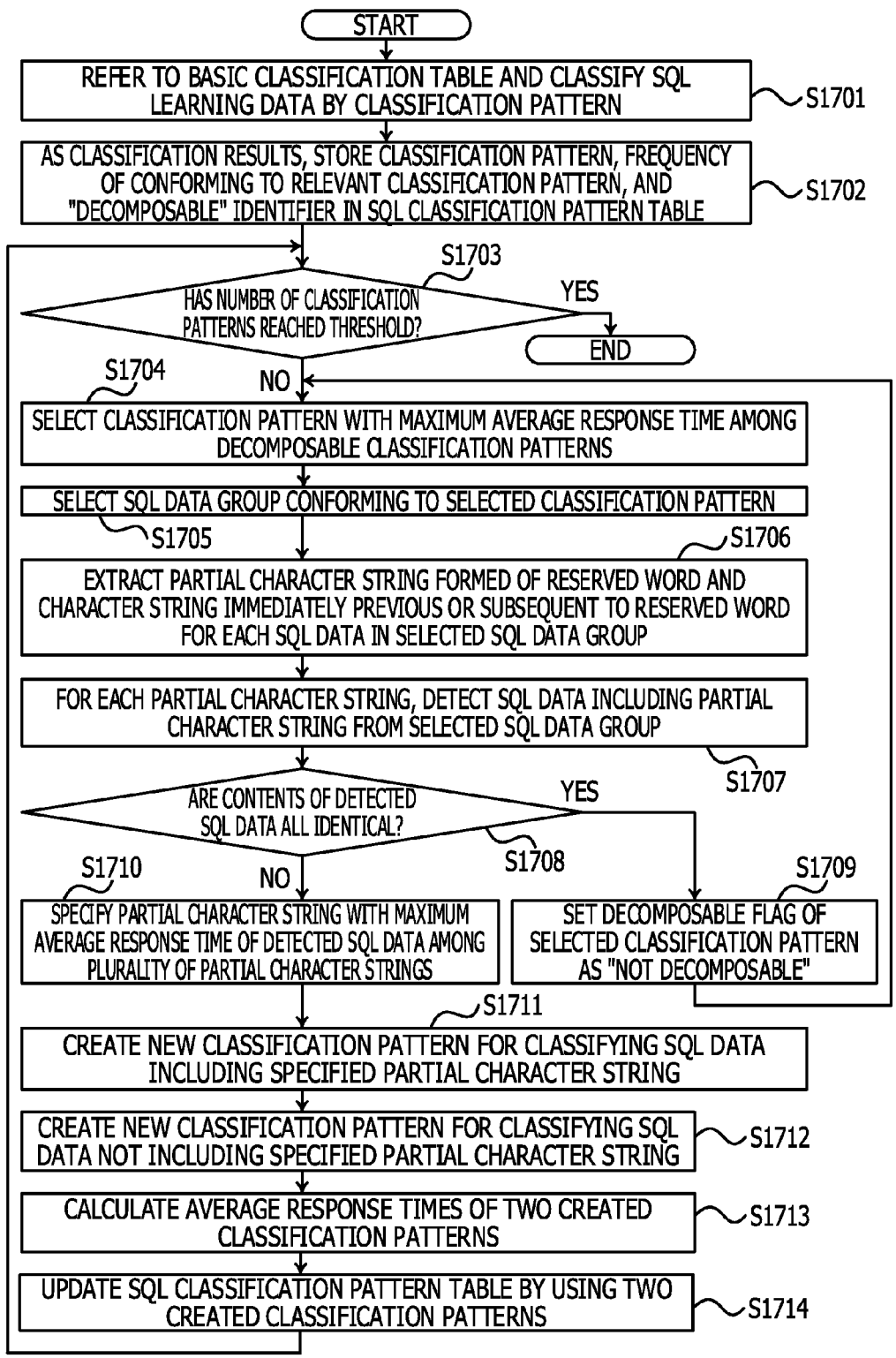
FIG. 17 is a flowchart of an example of a procedure of a classification pattern creating process in the second decomposition example.

FIG. 17 is a flowchart of an example of a procedure of a classification pattern creating process in the second decomposition example. The classification pattern creating process in the second decomposition example is a process of decomposing a classification pattern by dividing the classification pattern in the basic classification table 411 according to the second decomposition example. Also, in the classification pattern creating process of the second decomposition example, process details except those at step S1704, step S1710, and step S1713 are identical to process details having step numbers with the same last two digits in FIG. 12, and are not described herein.

In the case of No at step S1703 or after the end of the process at step S1709, the classification pattern creating apparatus 100 selects a classification pattern with the maximum average response time among decomposable classification patterns (step S1704). After the end of the process at step S1704, the classification pattern creating apparatus 100 proceeds to a process at step S1705.

In the case of No at step S1708, the classification pattern creating apparatus 100 specifies a partial character string with the maximum average response time of the detected SQL data among a plurality of partial character strings (step S1710). After the end of the process at step S1710, the classification pattern creating apparatus 100 proceeds to a process at step S1711.

Also, after the end of the process at step S1712, the classification pattern creating apparatus 100 calculates average response times of these two created classification patterns (step S1713). After the end of the process at step S1713, the classification pattern creating apparatus 100 proceeds to a process at step S1714. By performing the classification pattern creating process in the second decomposition example, the classification pattern creating apparatus 100 decomposes a classification pattern based on the average response time.

Third Decomposition Example

A third decomposition example is an example in which a classification pattern is decomposed based on a total response time. In the following, the third decomposition example is described by using FIG. 18 to FIG. 21. The basic classification table 411 and the reserved word table 412 in the third decomposition example are identical to the basic classification table 411-*ex*1 and the reserved word table 412-*ex*1 in the first decomposition example, and therefore are not described herein. Also, the SQL learning data 413 in the third decomposition example is identical to the SQL learning data 413-*ex*2, and therefore is not described herein.

Figure 18:
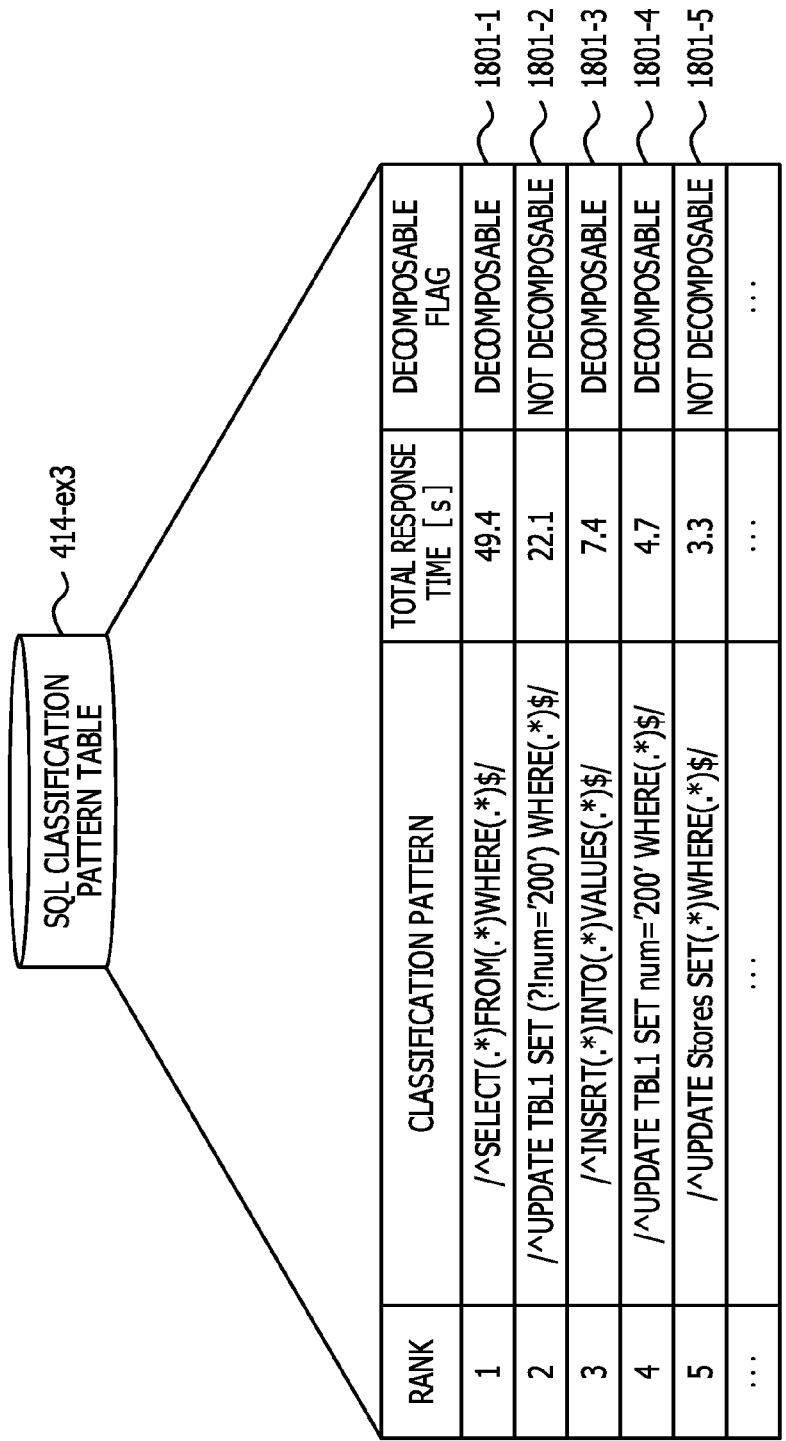
FIG. 18 depicts an example of details stored in an SQL classification pattern table in a third decomposition example.

FIG. 18 depicts an example of details stored in an SQL classification pattern table in a third decomposition example. An SQL classification pattern table 414-*ex*3 represents information where classification patterns created according to the third decomposition example are stored.

The SQL classification pattern table 414-*ex*3 depicted in FIG. 18 has records 1801-1 to 1801-5. The SQL classification pattern table 414-*ex*3 includes a field "total response time" in place of the field "frequency of appearance" included in the SQL classification pattern table 414-*ex*1.

In the field "total response time", a total value of response times of SQL data classified as the relevant classification pattern among SQL data in the SQL learning data 413-*ex*3 is stored. For example, the record 1801-1 indicates that the total response time of SQL data classified as a classification pattern 1801-1*p* as a classification pattern ranked first is 49.4 s and that classification pattern is decomposable.

Figure 19:
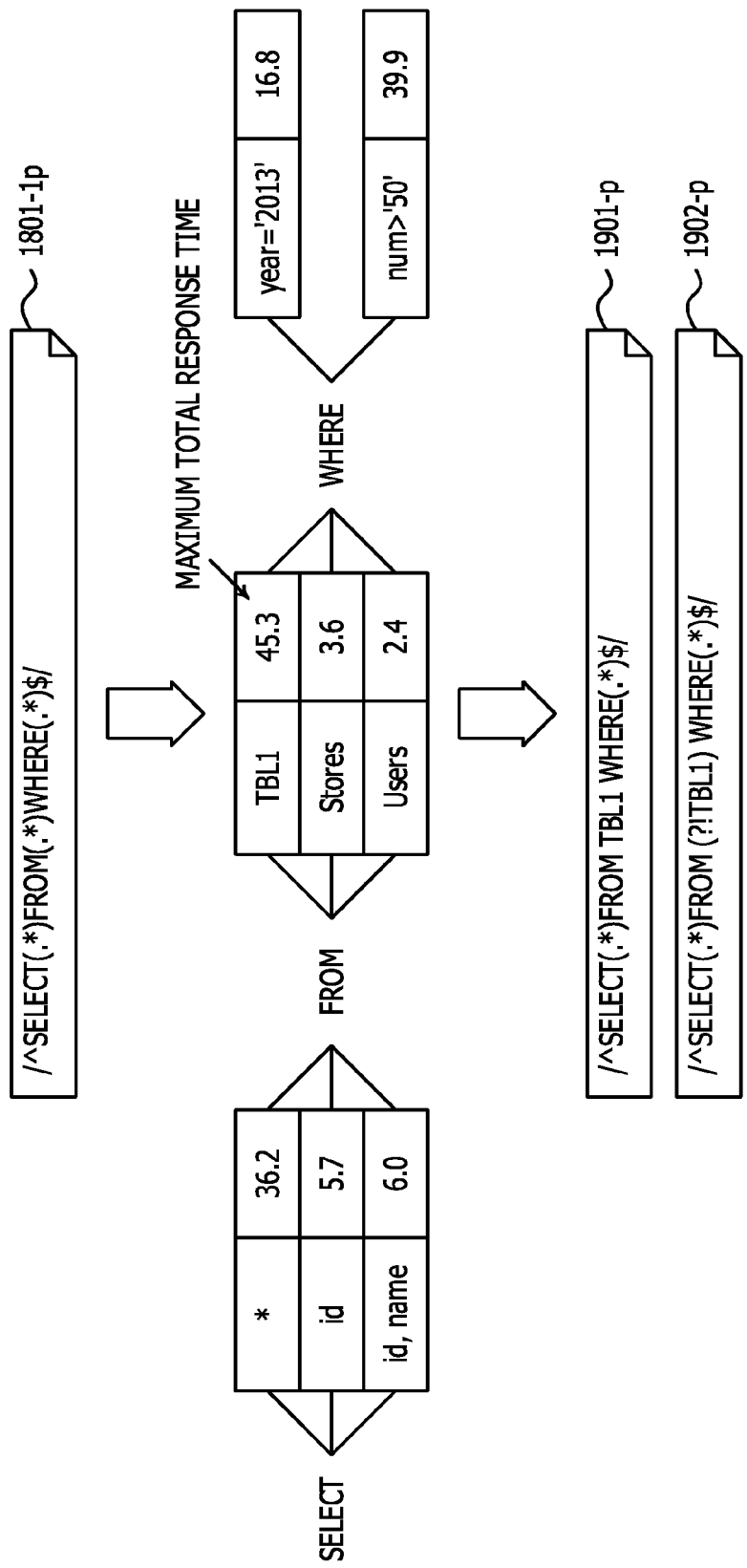
FIG. 19 depicts an example of decomposition of a classification pattern in the third decomposition example.

FIG. 19 depicts an example of decomposition of a classification pattern in the third decomposition example. After classifying SQL data in the SQL learning data 413-*ex*2, the classification pattern creating apparatus 100 decomposes a classification pattern with the longest total response time.

In the example of FIG. 19, it is assumed that the classification pattern 1801-1*p* is a classification pattern with the longest average response time and the average response time of SQL data classified as the classification pattern 1801-1*p* in the SQL learning data 413-*ex*3 is 49.4 s. In this case, the classification pattern creating apparatus 100 extracts a partial character string formed of a reserved word and a character string immediately previous or subsequent to the reserved word for each SQL data in the SQL data group conforming to the classification pattern 1801-1*p*. An example of the extracted partial character is identical to the example described with reference to FIG. 10, and therefore is not described herein.

Subsequently, the classification pattern creating apparatus 100 specifies a partial character string with the maximum total response time of SQL data including the partial character.

For example, the total response times of SQL data including "SELECT *", "SELECT id", and "SELECT id, name" in the SQL learning data 413-*ex*3 are 36.2 s, 5.7 s, and 6.0 s, respectively. Also, the total response times of SQL data including "FROM TBL1", "FROM Stores", and "FROM Users" in the SQL learning data 413-*ex*3 are 45.3 s, 3.6 s, and 2.4 s, respectively. Furthermore, the total response times of SQL data including "WHERE year='2013'" and "WHERE num>'50'" in the SQL learning data 413-*ex*3 are 16.8 s and 39.9 s, respectively.

Therefore, the classification pattern creating apparatus 100 specifies "FROM TBL1" as the partial character string with the maximum total response time of the SQL data including the partial character string. The classification pattern creating apparatus 100 then uses the specified partial character string to create a new classification pattern.

The classification pattern creating apparatus 100 creates a classification pattern 1901-*p* for classifying SQL data including the partial character string with the maximum total response time among SQL data classified with the classification pattern 1801-1*p*. The classification pattern creating apparatus 100 also creates a classification pattern 1902-*p* for classifying SQL data including a partial character string except the partial character string with the maximum total response time among the SQL data classified with the classification pattern 1801-1*p*.

Figure 20:
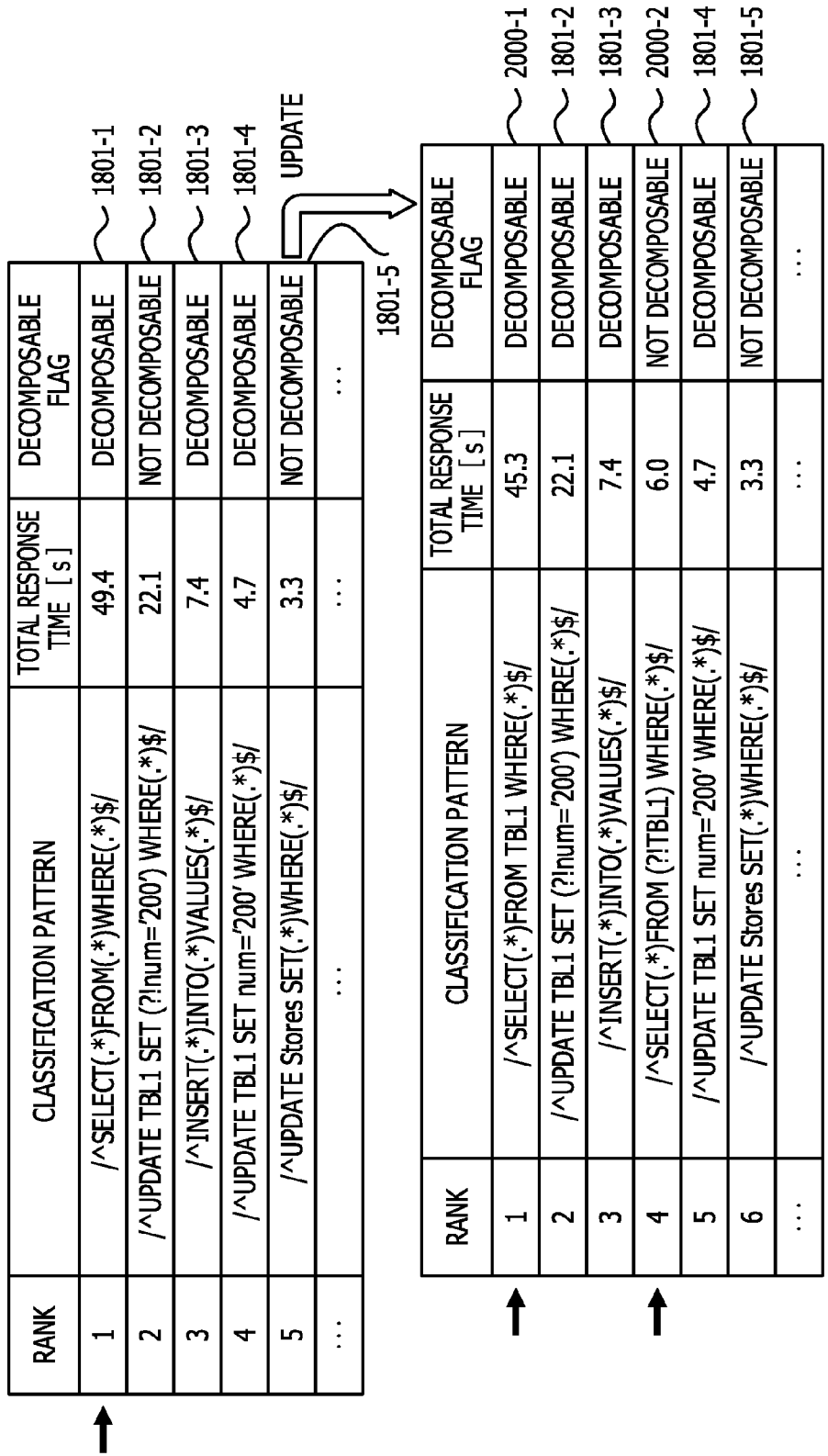
FIG. 20 depicts an example of updating an SQL classification pattern in the third decomposition example.

FIG. 20 depicts an example of updating an SQL classification pattern in the third decomposition example. The classification pattern creating apparatus 100 updates the SQL classification pattern table 414-*ex*3 so that the classification pattern 1801-1*p* is decomposed into the classification pattern 1901-*p* and the classification pattern 1902-*p*.

Then, the classification pattern creating apparatus 100 adds a record 2000-1 having the classification pattern 1901-*p* to the SQL classification pattern table 414-*ex*3 as a record ranked first, and adds a record 2000-2 having the classification pattern 1902-*p* to the SQL classification pattern table 414-*ex*3 as a record ranked fourth. The total response time of the record 2000-2 is 6.0 s, which is the sum of 3.6 and 2.4, which are the total response time of SQL data where the character string after "FROM" and before "WHERE" is "Stores" and the total response time of SQL data where the character string described above is "Users", respectively. The classification pattern creating apparatus 100 then deletes the record 1801-1 from the SQL classification pattern table 414-*ex*3.

Figure 21:
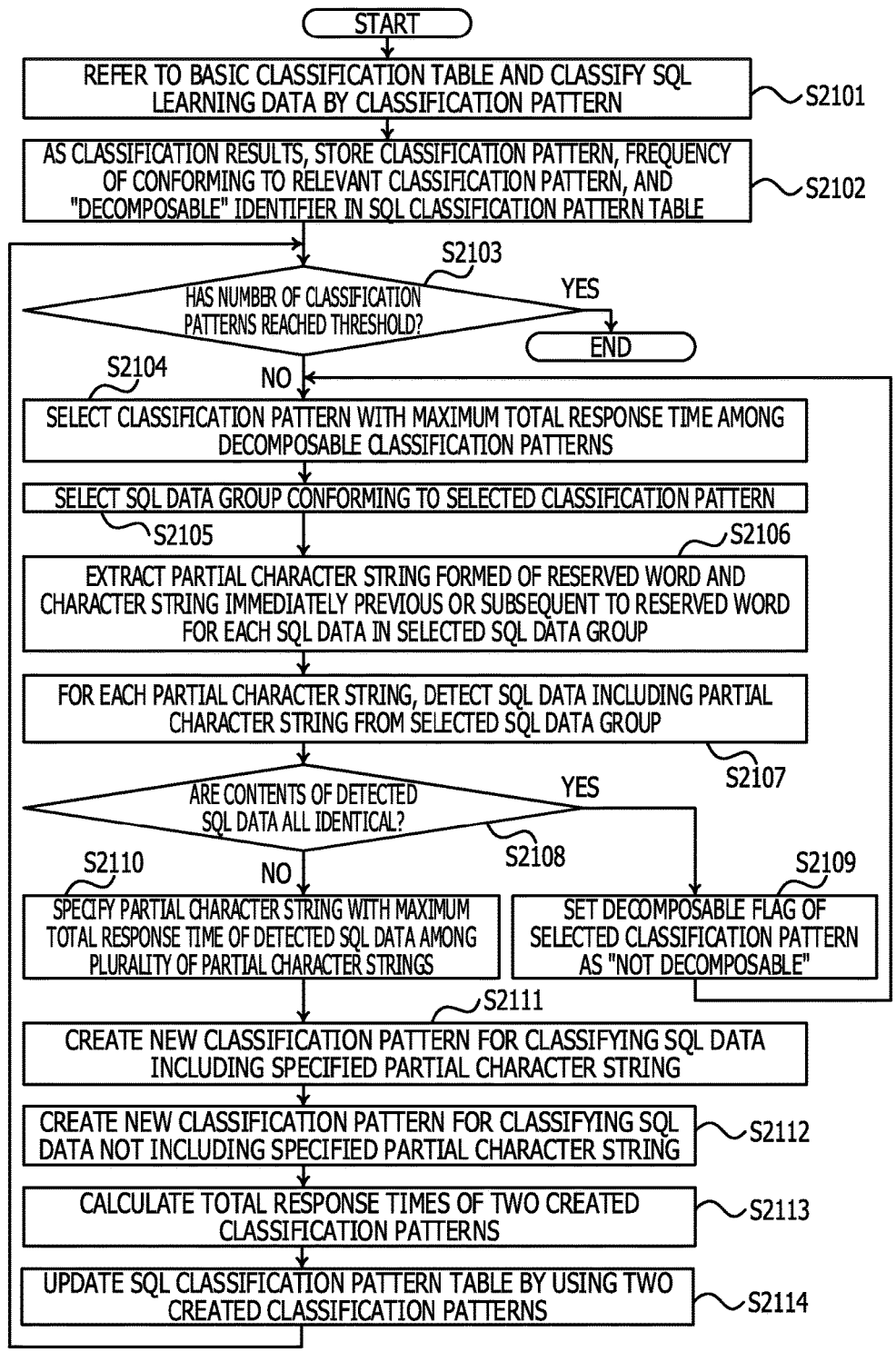
FIG. 21 is a flowchart of an example of a procedure of a classification pattern creating process in the third decomposition example.

FIG. 21 is a flowchart of an example of a procedure of a classification pattern creating process in the third decomposition example. The classification pattern creating process in the third decomposition example is a process of decomposing a classification pattern by dividing the classification pattern in the basic classification table 411 according to the third decomposition example. Also, in the classification pattern creating process in the third decomposition example, process details except those at step S2104, step S2110, and step S2113 are identical to process details having step numbers with the same last two digits in FIG. 17, and are not described herein. Furthermore, the processes at step S2104, step S2110, and step S2113 are similar to those at step S1704, step S1710, and step S1713 with "average response time" replaced by "total response time".

Also, in the process at step S2104, a classification with the maximum "average response time" in place of "total response time" may be selected. Furthermore, in the process at step S2110, "the partial character string with the maximum frequency of appearance" may be specified instead of specifying "the partial character string with the maximum total response time".

By performing the classification pattern creating process in the third decomposition example, the classification pattern creating apparatus 100 decomposes a classification pattern based on the total response time.

As described above, the classification pattern creating apparatus 100 creates a classification pattern where a character string with a high frequency of appearance paired with a reserved word in the SQL data group conforming to the classification pattern including the reserved word is set as a character string following the reserved word. With this, the classification pattern creating apparatus 100 creates a pattern for classifying the SQL data group that influences system performance. Also, the classification pattern creating apparatus 100 does not depend on message complexity, and humans do not have to recognize the system structure or appearance pattern. Also, the classification pattern creating apparatus 100 performs simple analysis depending on whether the word is a reserved word or not, and does not have to perform complex syntactic analysis. From the above, the classification pattern creating apparatus 100 creates a classification pattern at high speed and low cost.

Also, the classification pattern creating apparatus 100 may decompose a classification pattern based on the frequency of appearance of SQL data. With this, the system visualizing apparatus 202 using the created classification pattern classifies SQL data transmitted and received in the client system 201 in view of the frequency of appearance.

Furthermore, the classification pattern creating apparatus 100 may decompose a classification pattern based on the average response time of SQL data. SQL data with a long average response time is SQL data for which server processing takes time. Therefore, the system visualizing apparatus 202 using the created classification pattern classifies SQL data transmitted and received in the client system 201 in view of the time taken for processing of the server in the client system 201.

Still further, the classification pattern creating apparatus 100 may decompose a classification pattern based on the total response time of SQL data. SQL data with a long total response time is data that influences the performance of the client system 201, that is, data that imposes heavy loads on a server. Therefore, the system visualizing apparatus 202 using the created classification pattern classifies SQL data transmitted and received in the client system 201 in the decreasing order of loads on the server of the client system 201.

Second Embodiment

The classification pattern creating apparatus 100 according to the first embodiment creates a classification pattern by using SQL data collected previously. In this case, the tendencies of the previously-collected SQL data and SQL data transmitted and received during operation may be changed, and SQL data not conforming to the classification pattern may increase. For example, this may occur when the previously-collected SQL data is data acquired during the daytime and the SQL data during operation is data issued at nighttime.

Thus, a classification pattern creating apparatus according to the second embodiment updates a classification pattern during operation. Note that portions similar to those described in the first embodiment are provided with the same reference numerals and are not depicted or described herein. Also, for decomposition of the basic classification pattern in the classification pattern creating apparatus according to the second embodiment, any of the first to third decomposition examples may be applied. In the following, an example in which the first decomposition example is applied is used for description.

Figure 22:
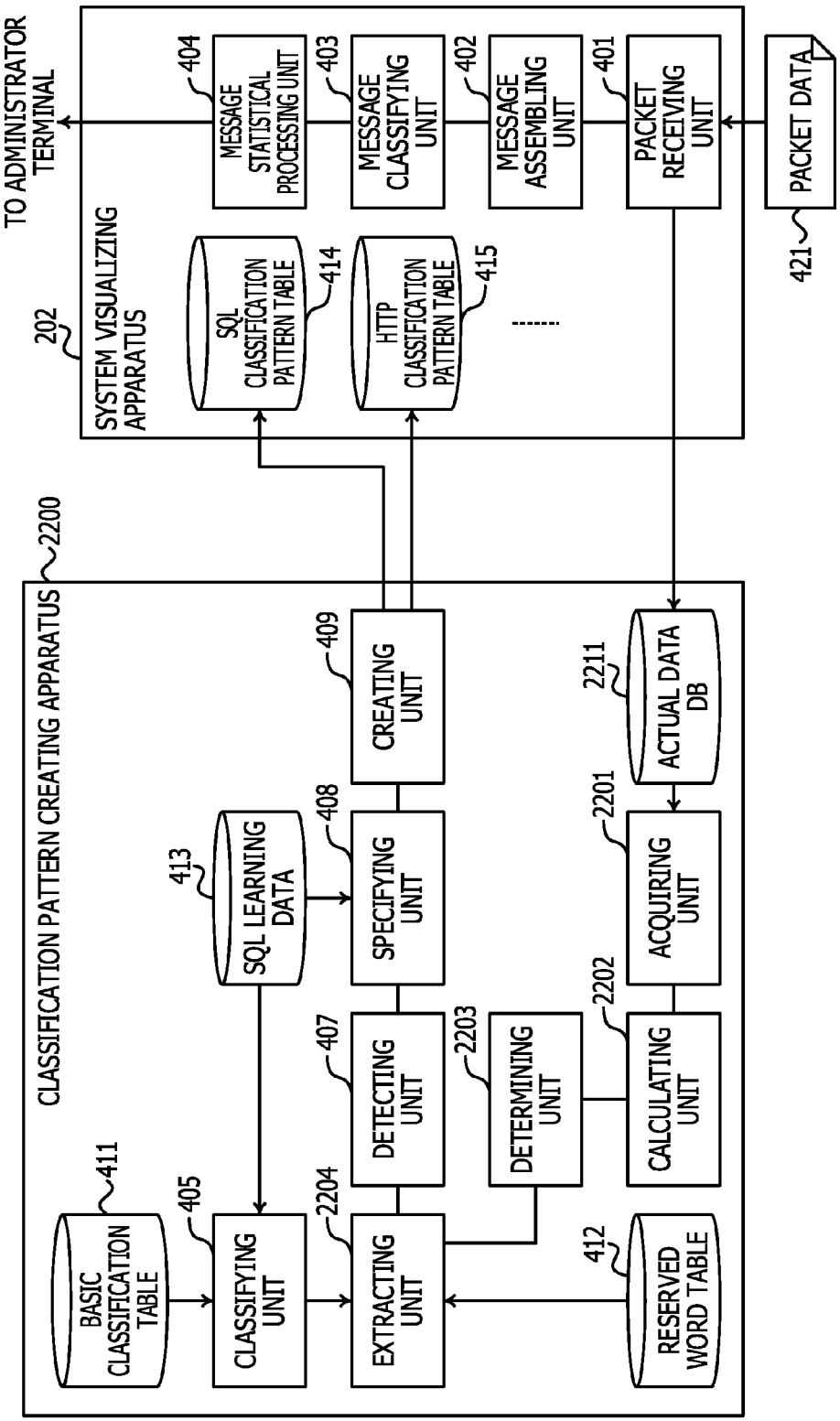
FIG. 22 depicts an example of functional structure of the system visualizing apparatus and a classification pattern creating apparatus according to a second embodiment.

FIG. 22 depicts an example of functional structure of the system visualizing apparatus and the classification pattern creating apparatus according to the second embodiment. A classification pattern creating apparatus 2200 according to the second embodiment includes the classifying unit 405, the detecting unit 407, the specifying unit 408, the creating unit 409, an acquiring unit 2201, a calculating unit 2202, a determining unit 2203, and an extracting unit 2204. With the CPU 301 executing a program stored in a storage apparatus, the functions of the acquiring unit 2201, the calculating unit 2202, the determining unit 2203, and the extracting unit 2204 are each performed. The storage apparatus is, for example, the ROM 302, the RAM 303, or the disk 305 depicted in FIG. 3. Also, the functions of the acquiring unit 2201, the calculating unit 2202, the determining unit 2203, and the extracting unit 2204 may be implemented with the CPU of the system visualizing apparatus 202 executing a program stored in a storage apparatus.

Also, the classification pattern creating apparatus 2200 is accessible to an actual data DB 2211. The actual data DB 2211 is stored in a storage apparatus such as the RAM 303 or the disk 305. The actual data DB 2211 has a data structure identical to that of the SQL learning data 413. The actual data DB 2211 is a storage area for storing SQL data assembled by the system visualizing apparatus 202 during operation.

The acquiring unit 2201 acquires from the actual data DB 2211 an SQL data group transmitted or received by each server in the client system 201.

The calculating unit 2202 calculates a ratio at which the SQL data group transmitted or received by the server and acquired by the acquiring unit 2201 conforms to the second classification pattern. For example, when the number of pieces of SQL data group acquired by the acquiring unit 2201 is 1000 and the number of pieces of SQL data conforming to the second classification pattern is 50, the calculating unit 2202 calculates a ratio as 50/1000=5%. Also, if there are a plurality of created second classification patterns, the calculating unit 2202 calculates a total of ratios of conformance to the second classification pattern. The total of ratios of conformance to the second classification pattern is hereinafter referred to as a "pattern conformance ratio". The calculation result is stored in a storage apparatus such as the RAM 303 or the disk 305.

The determining unit 2203 determines whether the second classification pattern is to be re-created, based on the patter conformance ratio calculated by the calculating unit 2202. For example, when the pattern conformance ratio is smaller than a predetermined threshold, the determining unit 2203 determines that the second classification pattern is to be re-created. The determination result is stored in a storage apparatus such as the RAM 303 or the disk 305.

The extracting unit 2204 has the functions of the extracting unit 406. Furthermore, when the determining unit 2203 determines that the second classification pattern is to be re-created again, the extracting unit 2204 extracts an SQL data group conforming to the first classification pattern in the SQL data group acquired by the acquiring unit 2201. Then, the extracting unit 2204 extracts a partial character string formed of a reserved word and a character string immediately previous or subsequent to the reserved word from the SQL data included in the extracted SQL data group.

Figure 23:
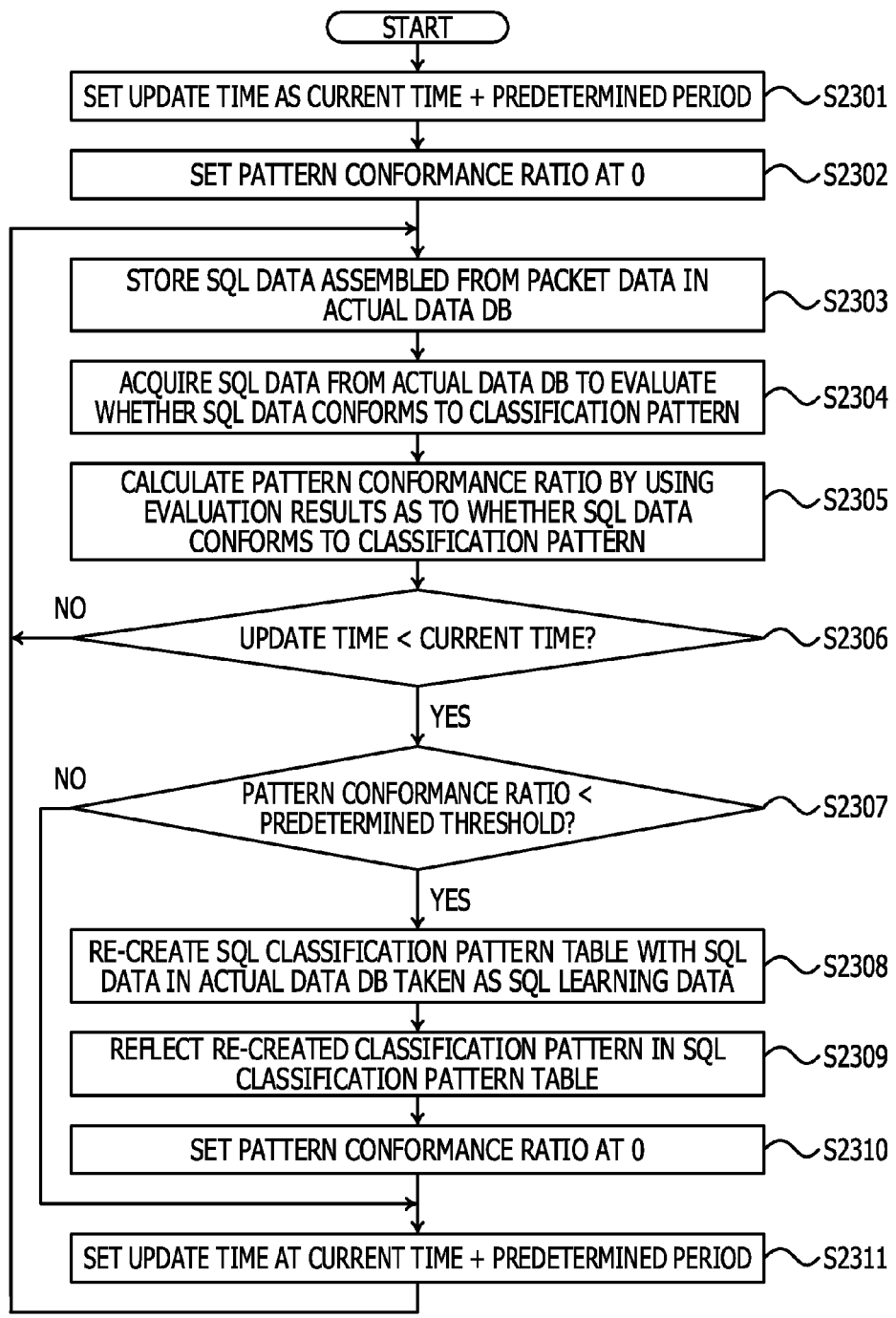
FIG. 23 is a flowchart of an example of a procedure of a classification pattern re-creation evaluating process according to the second embodiment.

FIG. 23 is a flowchart of an example of a procedure of a classification pattern re-creation evaluating process according to the second embodiment. The classification pattern re-creation evaluating process according to the second embodiment is a process of evaluating whether the classification pattern is to be re-created. Also, the classification pattern re-creation evaluating process is preferably performed by the classification pattern creating apparatus 2200 and the system visualizing apparatus 202 in cooperation with each other. The reason is that the process at step S2303 in part and the process at step S2304, both of which will be described further below, are originally performed by the system visualizing apparatus 202.

In the following description, it is assumed that the classification pattern creating apparatus 2200 performs the process at step S2303 in part, the process at step S2304, and all of the other processes. Conversely, the classification pattern creating apparatus 2200 may perform the processes at step S2308 and step S2309 and the system visualizing apparatus 202 may perform the other processes.

The classification pattern creating apparatus 2200 sets an update time as the current time+a predetermined period (step S2301). Next, the classification pattern creating apparatus 2200 sets the pattern conformance ratio at 0 (step S2302). Subsequently, the system visualizing apparatus 202 stores SQL data assembled from the packet data in the actual data DB 2211 (step S2303). After notified by the system visualizing apparatus 202 that the SQL data has been stored in the actual data DB 2211, the classification pattern creating apparatus 2200 acquires the SQL data from the actual data DB 2211 and evaluates whether the acquired SQL data conforms to the classification pattern (step S2304). When a classification pattern conforming to all SQL data is prepared in the basic classification table 411, the classification pattern creating apparatus 2200 evaluates that the SQL data conforms to the classification pattern when the SQL data conforms to a classification pattern other than the classification pattern conforming to all SQL data.

Here, the process of "assembling SQL data from the packet data" in the process at step S2303 and the process of "evaluating whether the SQL data conforms to the classification pattern" in the process at step S2304 are originally performed by the system visualizing apparatus 202. Therefore, among the processes in FIG. 23, the process at step S2303 in part, the process at step S2304, and all of the other processes may be performed by the classification pattern creating apparatus 2200.

Next, the system visualizing apparatus 202 calculates a pattern conformance ratio by using the evaluation results as to whether the SQL data conforms to the classification pattern (step S2305). Subsequently, the system visualizing apparatus 202 determines whether the update time is earlier than the current time (step S2306). When the update time is equal to or later than the current time (No at step S2306), the system visualizing apparatus 202 proceeds to the process at step S2303.

When the update time is earlier than the current time (Yes at step S2306), the system visualizing apparatus 202 determines whether the pattern conformance ratio is smaller than a predetermined threshold (step S2307). Specification of the predetermined threshold may be performed by, for example, a developer of the classification pattern creating apparatus 2200 or an administrator of the client system 201.

When the pattern conformance ratio is smaller than a predetermined threshold (Yes at step S2307), the system visualizing apparatus 202 instructs the classification pattern creating apparatus 2200 to re-create the SQL classification pattern table 414 by taking SQL data in the actual data DB 2211 as the SQL learning data 413 (step S2308). After the instruction, the system visualizing apparatus 202 becomes on standby until notified from the classification pattern creating apparatus 2200. For re-creation of the SQL classification pattern table 414, the classification pattern creating apparatus 2200 deletes all records in the SQL classification pattern table 414 and performs the processes depicted in FIG. 12. Subsequently, the classification pattern creating apparatus 2200 reflects the re-created classification pattern in the SQL classification pattern table 414 (step S2309). After the end of the process at step S2309, the classification pattern creating apparatus 2200 notifies the system visualizing apparatus 202 of the completion of reflection.

The system visualizing apparatus 202 accepting the notification sets a pattern conformance ratio at 0 (step S2310). After the end of the process at step S2310, or when the pattern conformance ratio is equal to or larger than a predetermined threshold (No at step S2307), the system visualizing apparatus 202 sets an update time at the current time+predetermined period (step S2311). After the end of the process at step S2311, the system visualizing apparatus 202 proceeds to the process at step S2303. By performing the classification pattern re-creation evaluating process according to the second embodiment, the classification pattern creating apparatus 2200 re-creates the classification pattern when the pattern conformance ratio is decreased.

As described above, the classification pattern creating apparatus 2200 calculates a pattern conformance ratio at which the SQL data transmitted or received by the server in the client system 201 conforms to the second classification pattern. The classification pattern creating apparatus 2200 outputs the pattern conformance ratio to the administrator terminal 203 to allow the administrator of the administrator terminal 203 to view the pattern conformance ration and determine whether the second classification pattern is to be re-created.

Also, when determining that the second classification pattern is to be re-created based on the pattern conformance ratio, the classification pattern creating apparatus 2200 creates the second classification pattern by using the SQL data group transmitted or received by each server in the client system 201. With this, the system visualizing apparatus 202 using the created classification pattern classifies SQL data with the classification pattern in accordance with the tendency of the SQL data even if the tendency of the SQL data transmitted and received in the client system 201 is changed.

Third Embodiment

The classification pattern creating apparatus 2200 according to the second embodiment initializes the classification pattern during operation and then re-creates the classification pattern. In this case, the classification pattern newly created and the classification pattern before initialization may significantly differ from each other. Thus, a classification pattern creating apparatus according to a third embodiment has a feature of determining whether to re-create a classification pattern from scratch or leave the classification pattern currently in use. Note that portions similar to those described in the first embodiment are provided with the same reference numerals and are not depicted or described herein. Also, for decomposition of the basic classification pattern in the classification pattern creating apparatus according to the third embodiment, any of the first to third decomposition examples may be applied. In the following, an example in which the first decomposition example is applied is used for description.

Figure 24:
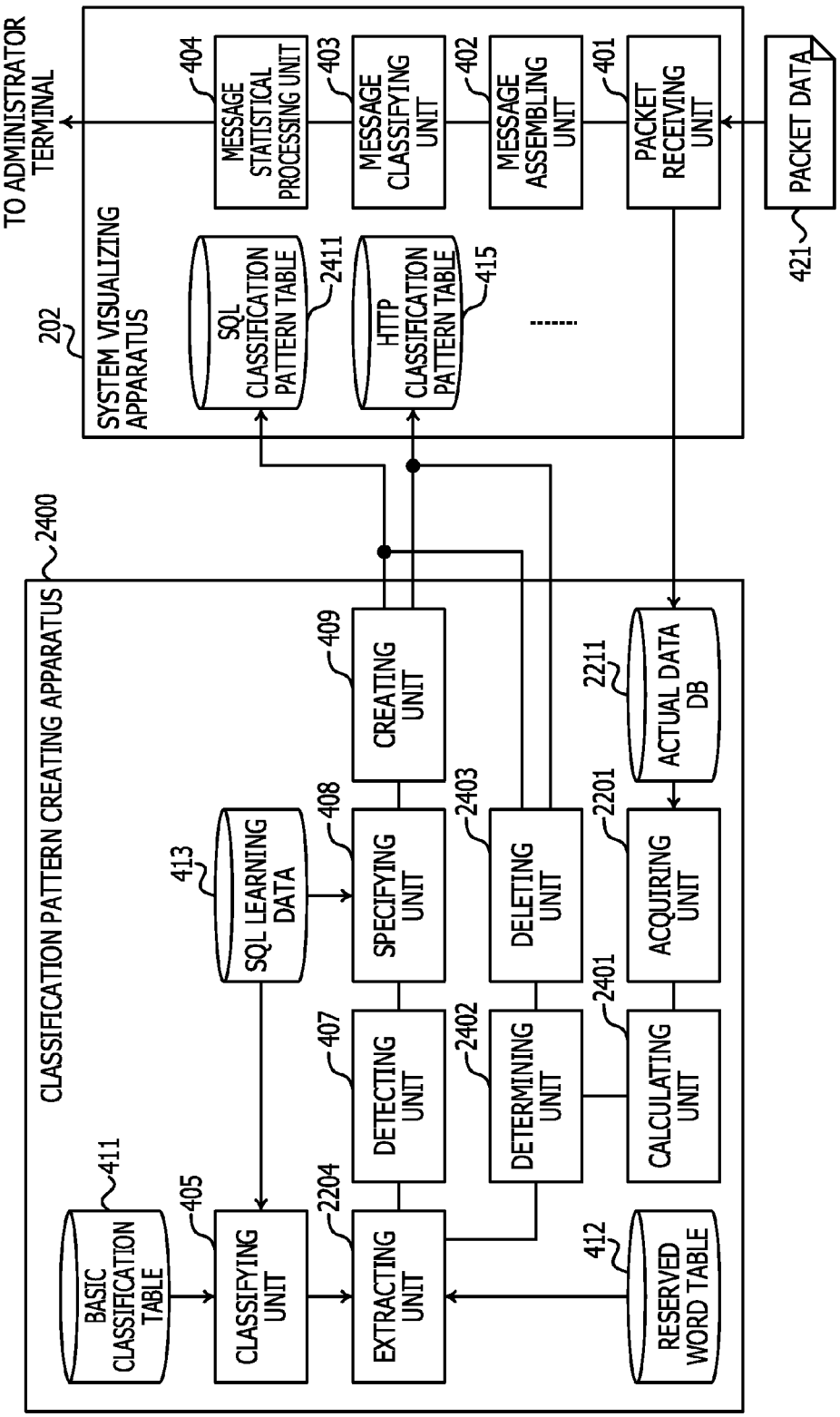
FIG. 24 depicts an example of functional structure of the system visualizing apparatus and a classification pattern creating apparatus according to a third embodiment.

FIG. 24 depicts an example of functional structure of the system visualizing apparatus and a classification pattern creating apparatus according to the third embodiment. A classification pattern creating apparatus 2400 according to the third embodiment includes the classifying unit 405, the detecting unit 407, the specifying unit 408, the creating unit 409, the acquiring unit 2201, the extracting unit 2204, a calculating unit 2401, a determining unit 2402, and a deleting unit 2403. With the CPU 301 executing a program stored in a storage apparatus, the functions of the calculating unit 2401, the determining unit 2402, and the deleting unit 2403 are each performed. The storage apparatus is, for example, the ROM 302, the RAM 303, or the disk 305 depicted in FIG. 3. Also, the functions of the calculating unit 2401, the determining unit 2402, and the deleting unit 2403 may be implemented with the CPU of the system visualizing apparatus 202 executing a program stored in a storage apparatus.

The calculating unit 2401 has the functions of the calculating unit 2202. Furthermore, when the second classification pattern is created, the calculating unit 2401 calculates a ratio at which the SQL data group in the SQL learning data 413 conforms to the second classification pattern.

The determining unit 2402 has the functions of the determining unit 2203. Furthermore, the determining unit 2402 determines whether the second classification pattern is to be deleted, based on a difference between a ratio at which the SQL data group conforms to the second classification pattern and a ratio at which the SQL data group acquired by the acquiring unit 2201 conforms to the second classification pattern. An example of determination will be described further below by using FIG. 27.

When the determining unit 2402 determines that the second classification pattern is to be re-created and the second classification pattern is to be deleted, the deleting unit 2403 deletes an obsolete second classification pattern. The obsolete second classification pattern is a pattern created before the SQL data group transmitted or received by each server of the client system 201 is acquired.

Figure 25:
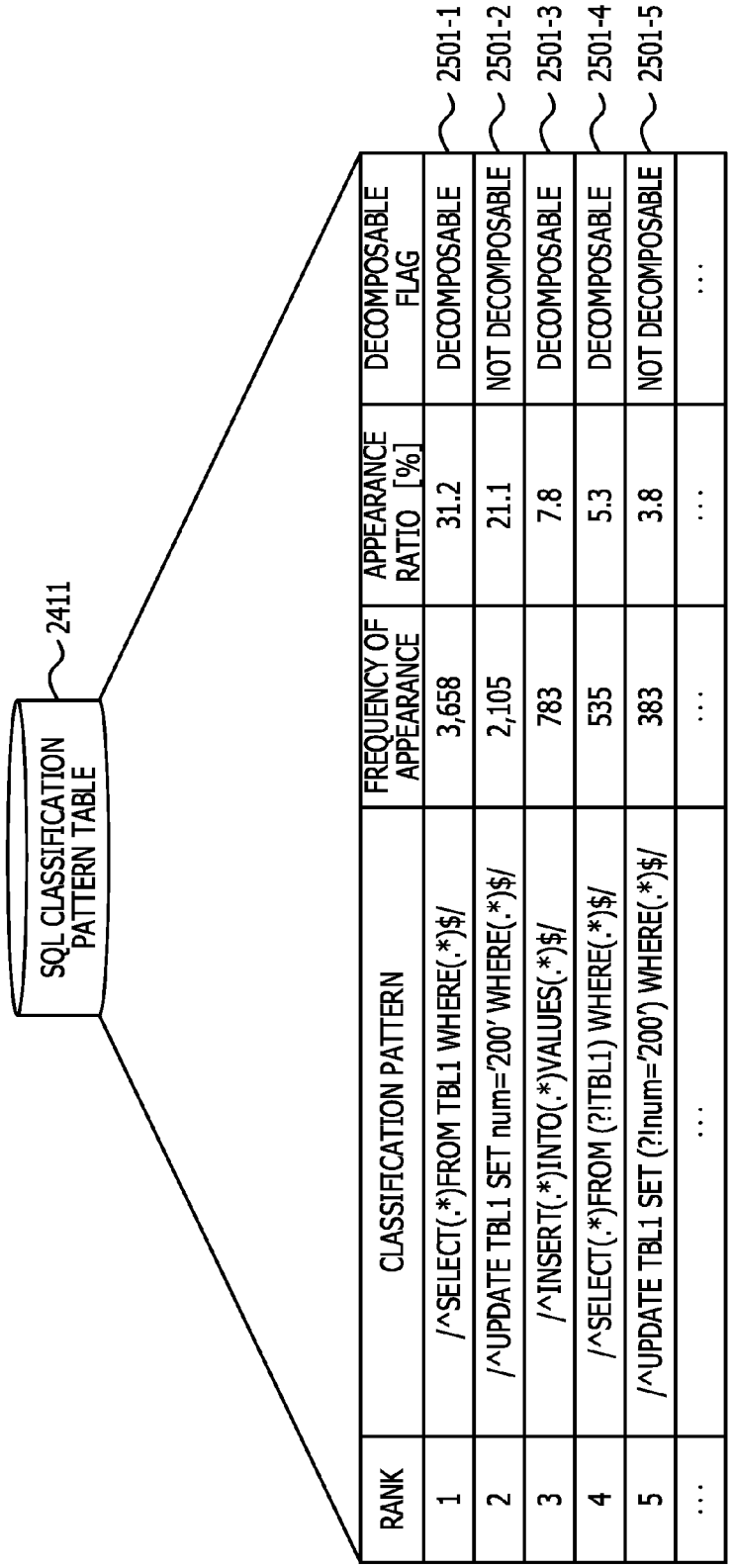
FIG. 25 depicts an example of details stored in an SQL classification pattern table according to the third embodiment.

FIG. 25 depicts an example of details stored in an SQL classification pattern table according to the third embodiment. An SQL classification pattern table 2411 represents information where classification patterns created according to the first decomposition example are stored. Also, the SQL classification pattern table 2411 is for two usages, that is, for SQL classification patterns at the time of classifying SQL data at the learning and for SQL classification patterns at the time of classifying SQL data in the actual data DB 2211 in operation.

The SQL classification pattern table 2411 depicted in FIG. 25 has records 2501-1 to 2501-5. The SQL classification pattern table 2411 has the fields of the SQL classification pattern table 414-ex1, and further has a field "appearance ratio".

The field "appearance ratio" indicates a ratio at which the relevant SQL classification pattern appears in the SQL data at the time of learning or in the SQL data in the actual data DB 2211. For example, the record 2501-1 indicates that a frequency of appearance of SQL data classified as a classification pattern 2501-1$p$ as a classification pattern ranked first is 3658 and an appearance ratio of 31.2%, and the classification pattern is decomposable.

Figure 26:
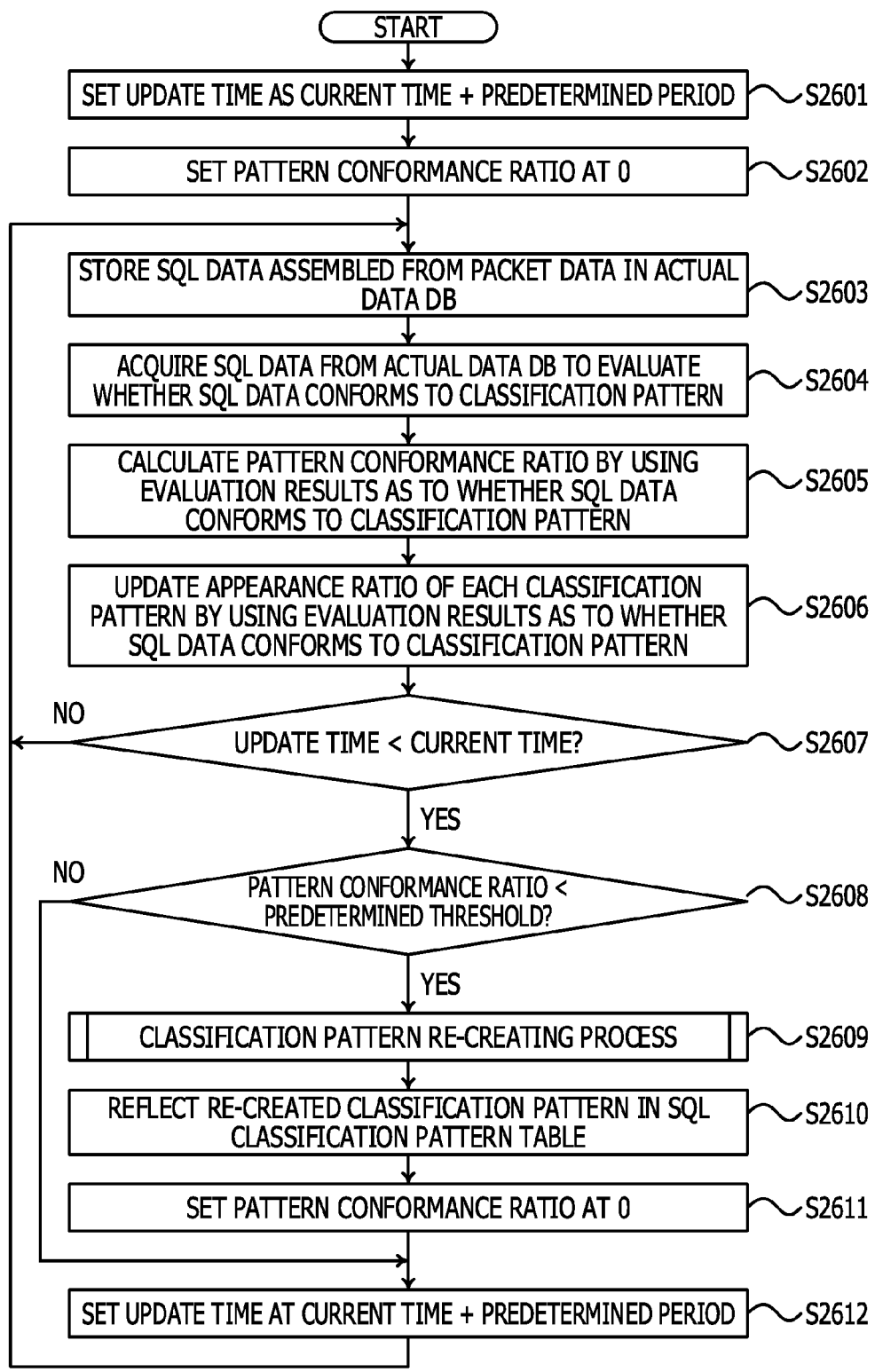
FIG. 26 is a flowchart of an example of a procedure of the classification pattern re-creation evaluating process according to the third embodiment.
Figure 27:
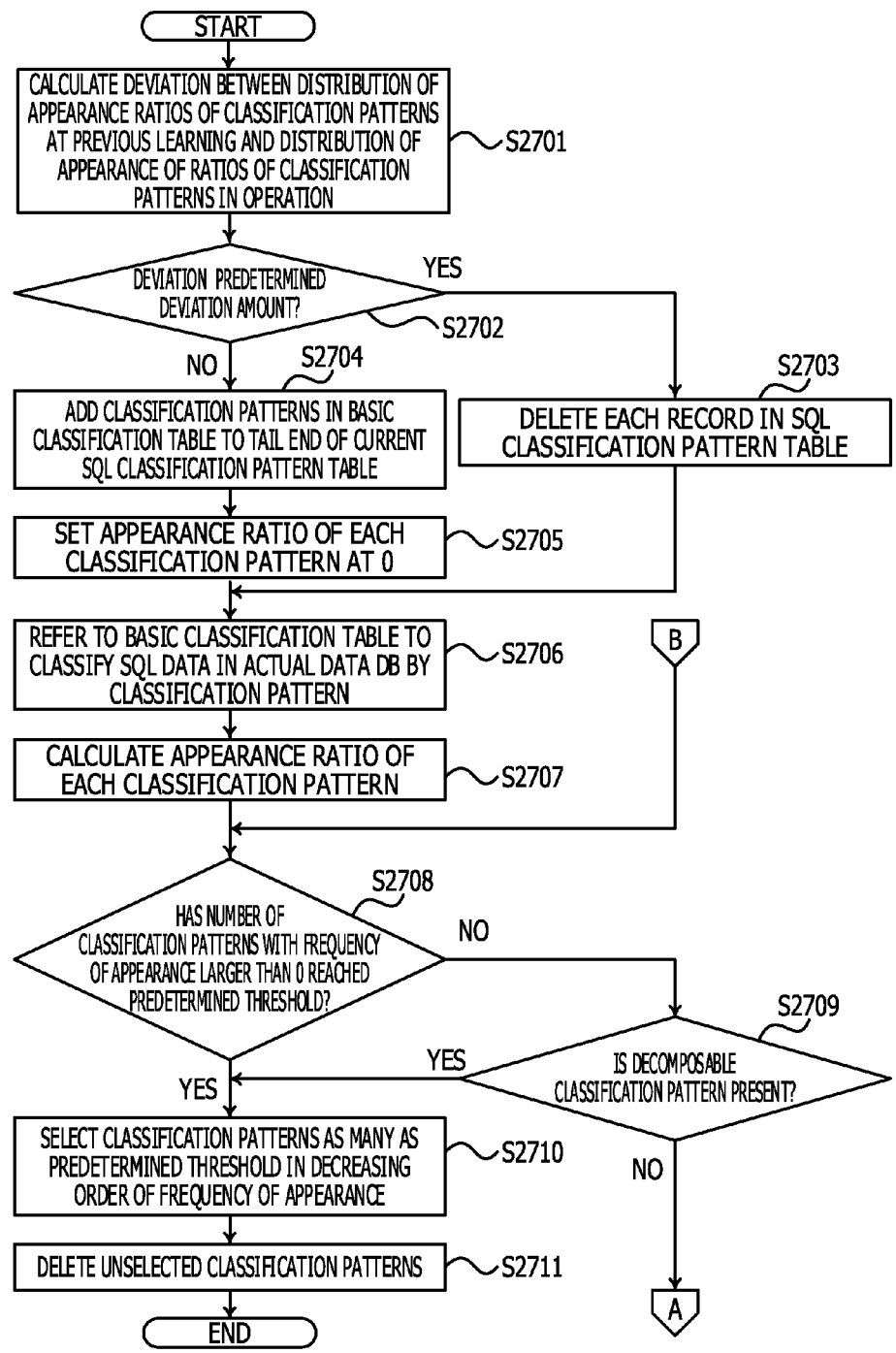
FIG. 27 is a flowchart of an example of a classification pattern re-creating process according to the third embodiment.
Figure 28:
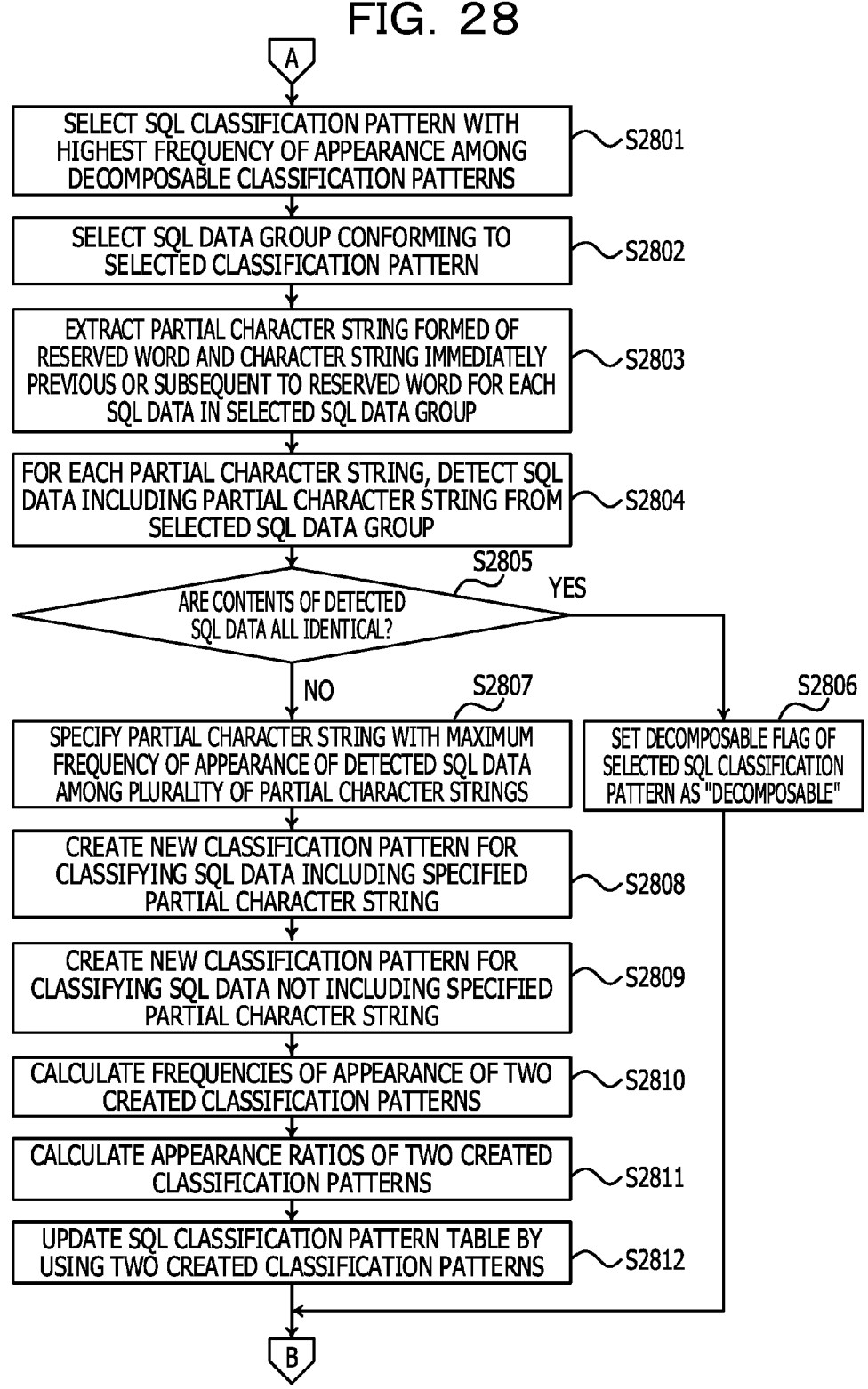
FIG. 28 is a flowchart of the example of the classification pattern re-creating process according to the third embodiment.

Next, flowcharts according to the third embodiment are described by using FIG. 26 to FIG. 28. A classification pattern initial creating process to be performed prior to operation is approximately similar to the classification pattern creating process in the first decomposition example depicted in FIG. 12, and therefore is not described herein. As a change point from the flowchart of FIG. 12, after the process at step S1201 is performed, the classification pattern creating apparatus 2400 calculates the appearance ratio of each classification pattern at step S1202. The appearance ratio for each classification means a ratio of the classification to all classification patterns. And, the classification pattern creating apparatus 2400 recalculates appearance ratios of the two classification patterns created by the decomposing at step S1213.

FIG. 26 is a flowchart of an example of a procedure of the classification pattern re-creation evaluating process according to the third embodiment. The classification pattern re-creation evaluating process according to the third embodiment is a process of evaluating whether to re-create a classification pattern. Also, step S2601 to step S2605, step S2607, step S2608, and step S2610 to step S2612 are processes identical to those at step S2301 to step S2307 and step S2309 to step S2311, and therefore are not described herein.

After the end of process at step S2605, the classification pattern creating apparatus 2400 updates the appearance ratio of each classification pattern by using the evaluation results as to whether the SQL data conforms to the classification pattern (step S2606). After the end of the process at step S2606, the classification pattern creating apparatus 2400 proceeds to a process at step S2607.

When the pattern conformance ratio is smaller than a predetermine threshold (Yes at step S2608), the classification pattern creating apparatus 2400 performs a classification pattern re-creating process (step S2609). The classification pattern re-creating process will be described by using FIG. 27 and FIG. 28. After the end of the process at step S2609, the classification pattern creating apparatus 2400 proceeds to a process at step S2610. By performing the classification pattern re-creation evaluating process according to the third embodiment, the classification pattern creating apparatus 2400 re-creates the classification pattern when the pattern conformance ratio is decreased.

FIG. 27 and FIG. 28 are flowcharts of an example of the classification pattern re-creating process according to the third embodiment. The classification pattern re-creating process according to the third embodiment is a process of re-creating the classification pattern.

The classification pattern creating apparatus 2400 calculates a deviation between a distribution of appearance ratios of the classification patterns at the previous learning and a distribution of appearance ratios of the classification patterns in operation (step S2701). As a deviation calculating method, for example, the classification pattern creating apparatus 2400 finds the square of a difference in appearance ratio of the classification pattern ranked first between the SQL classification pattern table 2411 at the previous learning and the SQL classification pattern table 2411 in operation. Similarly, after finding the square of a difference in appearance ratio of the classification pattern ranked second between the SQL classification pattern table 2411 at the previous learning and the SQL classification pattern table 2411 in operation, . . . , the classification pattern creating apparatus 2400 accumulates the found squares of the difference in appearance ratio. The classification pattern creating apparatus 2400 determines the accumulated value as a deviation of the appearance ratio of the classification pattern. Other than the sum of the squares of the difference, the classification pattern creating apparatus 2400 may take a variance or standard deviation of the appearance ratio at the previous learning and that in operation as a deviation.

Next, the classification pattern creating apparatus 2400 determines whether the deviation is equal to or larger than a predetermined deviation amount (step S2702). When the deviation is equal to or larger than the predetermined deviation amount (Yes at step S2702), the classification pattern creating apparatus 2400 deletes each record in the SQL classification pattern table 2411 (step S2703). On the other hand, when the deviation is smaller than the predetermined deviation amount (No at step S2702), the classification pattern creating apparatus 2400 adds the classification patterns in the basic classification table 411 to the tail end of the current SQL classification pattern table 2411 (step S2704). Subsequently, the classification pattern creating apparatus 2400 sets an appearance ratio of each classification pattern at 0 (step S2705).

After the end of the process at step S2703 or step S2705, the classification pattern creating apparatus 2400 refers to the basic classification table 411 and classifies the SQL data in the actual data DB 221 by classification pattern (step S2706). Next, the classification pattern creating apparatus 2400 calculates an appearance ratio of each classification pattern (step S2707).

After the end of the process at step S2707 or after the end of a process at step S2806 or step S2812, which will be described further below, the classification pattern creating apparatus 2400 determines whether the number of classification patterns with a frequency of appearance larger than 0 has reached a predetermined threshold (step S2708). If the number of SQL classification patterns with a frequency of appearance larger than 0 has not reached the predetermined threshold (No at step S2708), the classification pattern creating apparatus 2400 then determines whether a decomposable classification pattern is present (step S2709). When no decomposable classification pattern is present (No at step S2709), the classification pattern creating apparatus 2400 proceeds to a process at step S2801 depicted in FIG. 28.

If the number of SQL classification patterns with a frequency of appearance larger than 0 has reached the predetermined threshold (Yes at step S2708) or when a decomposable classification pattern is present (Yes at step S2709), the classification pattern creating apparatus 2400 selects a classification pattern as many as a predetermined threshold in decreasing order of the frequency of appearance (step S2710). Next, the classification pattern creating apparatus 2400 deletes unselected classification patterns (step S2711). After the end of the process at step S2711, the classification pattern creating apparatus 2400 ends the classification re-creating process according to the third embodiment.

Processes at step S2801 to step S2810 and step S2812 in FIG. 28 are identical to those at step S1204 to step S1214 in FIG. 12, and therefore are not described herein. After the end of the process at step S2810, the classification pattern creating apparatus 2400 calculates appearance ratios of the two created classification patterns (step S2811). After the end of the process at step S2811, the classification pattern creating apparatus 2400 proceeds to the process at step S2812. By performing the classification pattern re-creating process according to the third embodiment, the classification pattern creating apparatus 2400 re-creates the classification pattern by inheriting the previous classification pattern.

As described above, the classification pattern creating apparatus 2400 may delete the obsolete second classification pattern based on a difference between the pattern conformance ratio of the second classification pattern in the acquired SQL data group and the pattern conformance ratio of the second classification pattern in the SQL learning data 413. On the other hand, the classification pattern creating apparatus 2400 may not delete the obsolete second classification pattern. With the obsolete second classification pattern undeleted, the system visualizing apparatus 202 using the created classification pattern avoids a significant change in viewability of the visualized classification results every time any classification pattern is changed.

The classification pattern creating method described in the embodiments is implemented by a computer such as a personal computer or work station executing a program provided in advance. The program is recorded in a computer-readable recording medium such as a hard disk, flexible disk, CD-ROM, MO, DVD, or the like and is executed by being read by the computer from the recording medium. Also, the program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of creating classification pattern, the method comprising:

extracting a partial character string including a reserved word and a character string immediately previous or subsequent to the reserved word from each of a plurality of pieces of target data such that a plurality of different partial character strings are extracted, the plurality of pieces of target data conforming to a first pattern character string including the reserved word defined by a protocol;

detecting a number of the pieces of target data that include each different partial character string extracted from the plurality of pieces of target data;

specifying a first partial character string from the extracted partial character strings, the first partial character string being specified based on the number of pieces of target data that include the first partial character string or a response time of the pieces of target data that include the first partial character string; and creating, by a processor, a second pattern character string for classifying the plurality of pieces of target data based on the first pattern character string and the first partial character string, wherein each of the pieces of target data is a message requesting a process from a server, and the specifying specifies the first partial character string from the partial character strings based on a response time from a time when the detected message is transmitted to the server and a time when a response comes from the server.

2. The method according to claim 1, further comprising:

calculating, for each of the messages, a total response time obtained by accumulating response times each from the time when the detected message is transmitted to the server and the time when the response comes from the server; wherein the specifying specifies the first partial character string from the partial character strings based on the total response time for each of the messages.

3. The method according to claim 1, wherein the plurality of pieces of target data are messages transmitted or received by a server connected to a computer, the method further comprising:

acquiring the plurality of messages transmitted or received by the server; and calculating a first ratio at which the plurality of acquired messages conform to the second pattern character string.

4. The method according to claim 3, further comprising:

determining whether the second pattern character string is to be re-created, based on the calculated ratio, wherein the extracting extracts the partial character string from one or plurality of messages conforming to the first pattern character string among the plurality of acquired messages when a determination is made that the second pattern character string is to be re-created.

5. The method according to claim 4, further comprising:

calculating a second ratio at which at which the one or plurality of messages conform to the second pattern character string when the second pattern character string is created;

determining whether the second pattern character string is to be deleted based on a difference between the first ratio and the second ratio; and deleting the second pattern character string before acquiring the plurality of messages transmitted or received by the server when a determination is made that the second pattern character string is to be re-created and the second pattern character string is to be deleted.

6. An apparatus comprising:

a memory; and a processor coupled to the memory and configured to:

extract a partial character string including a reserved word and a character string immediately previous or subsequent to the reserved word from each of a plurality of pieces of target data such that a plurality of different partial character strings are extracted, the plurality of pieces of target data conforming to a first pattern character string including the reserved word defined by a protocol, detect a number of the pieces of target data that include each different partial character string extracted from the plurality of pieces of target data, specify a first partial character string from the extracted partial character strings, the first partial character string being specified based on the number of pieces of target data that include the first partial character string or a response time of the pieces of target data that include the first partial character string, and create a second pattern character string for classifying the plurality of pieces of target data based on the first pattern character string and the first partial character string, wherein each of the pieces of target data is a message requesting a process from a server, and the processor is configured to specify the first partial character string from the partial character strings based on a response time from a time when the detected message is transmitted to the server and a time when a response comes from the server.

7. The apparatus according to claim 6, wherein the processor is configured to:

calculate, for each of the messages, a total response time obtained by accumulating response times each from the time when the detected message is transmitted to the server and the time when the response comes from the server, and specify the first partial character string from the partial character strings based on the total response time for each of the messages.

8. The apparatus according to claim 6, wherein the plurality of pieces of target data are messages transmitted or received by a server connected to a computer, wherein the processor is configured to:

acquire the plurality of messages transmitted or received by the server, and calculate a first ratio at which the plurality of acquired messages conform to the second pattern character string.

9. The apparatus according to claim 8, wherein the processor is configured to:

determine whether the second pattern character string is to be re-created, based on the calculated ratio, and extract the partial character string from one or plurality of messages conforming to the first pattern character string among the plurality of acquired messages when a determination is made that the second pattern character string is to be re-created.

10. The apparatus according to claim 9, wherein the processor is configured to:

calculate a second ratio at which at which the one or plurality of messages conform to the second pattern character string when the second pattern character string is created, determine whether the second pattern character string is to be deleted based on a difference between the first ratio and the second ratio, and delete the second pattern character string before acquiring the plurality of messages transmitted or received by the server when a determination is made that the second pattern character string is to be re-created and the second pattern character string is to be deleted.

11. A non-transitory computer-readable recording medium storing a program that causes a computer to execute a process, the process comprising:
 extracting a partial character string including a reserved word and a character string immediately previous or subsequent to the reserved word from each of a plurality of pieces of target data such that a plurality of different partial character strings are extracted, the plurality of pieces of target data conforming to a first pattern character string including the reserved word defined by a protocol;
 detecting a number of the pieces of target data that include each different partial character string extracted from the plurality of pieces of target data;
 specifying a first partial character string from the extracted partial character strings, the first partial character string being specified based on the number of pieces of target data that include the first partial character string or a response time of the pieces of target data that include the first partial character string; and
 creating a second pattern character string for classifying the plurality of pieces of target data based on the first pattern character string and the first partial character string, wherein
 each of the pieces of target data is a message requesting a process from a server, and
 the specifying specifies the first partial character string from the partial character strings based on a response time from a time when the detected message is transmitted to the server and a time when a response comes from the server.

12. The non-transitory computer-readable recording medium according to claim 11, the process further comprising:
 calculating, for each of the messages, a total response time obtained by accumulating response times each from the time when the detected message is transmitted to the server and the time when the response comes from the server; wherein
 the specifying specifies the first partial character string from the partial character strings based on the total response time for each of the messages.

13. The non-transitory computer-readable recording medium according to claim 11, wherein the plurality of pieces of target data are messages transmitted or received by a server connected to a computer,
 the process further comprising:
  acquiring the plurality of messages transmitted or received by the server; and
  calculating a first ratio at which the plurality of acquired messages conform to the second pattern character string.

14. The non-transitory computer-readable recording medium according to claim 13, the process further comprising:
 determining whether the second pattern character string is to be re-created, based on the calculated ratio,
 wherein the extracting extracts the partial character string from one or plurality of messages conforming to the first pattern character string among the plurality of acquired messages when a determination is made that the second pattern character string is to be re-created.

* * * * *